(12) United States Patent
Hirooka et al.

(10) Patent No.: US 7,073,323 B2
(45) Date of Patent: Jul. 11, 2006

(54) SECONDARY AIR SUPPLY APPARATUS AND METHOD FOR DETECTING ABNORMALITY THEREOF

(75) Inventors: Shigemasa Hirooka, Susono (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 282 days.

(21) Appl. No.: 10/234,147

(22) Filed: Sep. 5, 2002

(65) Prior Publication Data

US 2003/0061805 A1 Apr. 3, 2003

(30) Foreign Application Priority Data

Sep. 14, 2001 (JP) ........................................ 2001-280302

(51) Int. Cl.
*F01N 3/00* (2006.01)

(52) U.S. Cl. .............................. 60/289; 60/274; 60/277; 60/293

(58) Field of Classification Search .................. 60/289, 60/291, 292, 293, 274, 277
See application file for complete search history.

(56) References Cited

U.S. PATENT DOCUMENTS

| | | | |
|---|---|---|---|
| 5,140,810 A | * | 8/1992 | Kuroda |
| 5,333,446 A | | 8/1994 | Itoh |
| 5,400,591 A | * | 3/1995 | Aramaki ...................... 60/274 |
| 5,519,992 A | * | 5/1996 | Hosoya et al. ................. 60/276 |
| 5,560,199 A | * | 10/1996 | Agustin et al. ................ 60/274 |
| 5,706,653 A | * | 1/1998 | Shoji et al. ..................... 60/276 |
| 5,709,080 A | | 1/1998 | Arora et al. |
| 5,782,086 A | * | 7/1998 | Kato et al. |
| 5,852,929 A | * | 12/1998 | Kato et al. ..................... 60/274 |
| 5,921,077 A | * | 7/1999 | Bayerle et al. |
| 6,138,504 A | * | 10/2000 | Lewis et al. ................. 73/118.2 |
| 6,233,925 B1 | * | 5/2001 | Hirota et al. .................. 60/285 |
| 6,393,833 B1 | * | 5/2002 | Mizoguchi |
| 2001/0013222 A1 | | 8/2001 | Mizoguchi |

FOREIGN PATENT DOCUMENTS

| | | | |
|---|---|---|---|
| JP | A 4-50423 | 2/1992 | |
| JP | 05-179936 | 7/1993 | |
| JP | A 9-21312 | 1/1997 | |
| JP | A 9-125945 | 5/1997 | |
| JP | A 9-125946 | 5/1997 | |
| JP | 09-125946 | * 5/1997 | |

* cited by examiner

*Primary Examiner*—Diem Tran
(74) *Attorney, Agent, or Firm*—Oliff & Berridge, PLC

(57) ABSTRACT

A secondary air supply apparatus controls emissions from an engine through secondary combustion of combustible matters in exhaust gas accomplished by supplying air to an exhaust pipe upstream of an emission control device. A pressure behavior pattern is determined from a pressure value detected by a pressure sensor disposed between an air pump and an open-close valve, and a pressure variation value. The secondary air supply apparatus determines operational states of the air pump and the open-close valve based on variations of the pressure behavior pattern at the time of a secondary air supply control and at the time of a secondary air stop control.

25 Claims, 20 Drawing Sheets

SECONDARY AIR SUPPLY APPARATUS AND METHOD FOR DETECTING ABNORMALITY THEREOF

INCORPORATION BY REFERENCE

The disclosure of Japanese Patent Application No. 2001-280302 filed on Sep. 14, 2001 including the specification, drawings and abstract is incorporated herein by reference in its entirety.

BACKGROUND OF THE INVENTION

1. Field of the Invention

The invention relates to a secondary air supply apparatus for supplying secondary air to an upstream side of an emission control apparatus disposed in an exhaust system of an internal combustion engine and method for detecting an abnormality of the secondary air supply apparatus, more particularly, to a secondary air supply apparatus and method capable of detecting an abnormality of a component part of the apparatus.

2. Description of the Related Art

In a known emission control apparatus of an internal combustion engine, a three-way catalyst is disposed in an exhaust system in order to lessen the CO, HC and NOx components in exhaust gas. In a known technology for enhancing emission control, air is delivered by an air pump into a secondary air supply passage equipped with an open-close valve connected to an exhaust pipe, so that the secondary air supplied into the exhaust pipe increases the oxygen concentration and therefore causes oxidation of HC and CO in exhaust gas.

If a component element of the secondary air supply apparatus, such as the air pump, the open-close valve, etc., has an abnormality, the exhaust gas cleaning efficiency will reduce, and emission will deteriorate. Therefore, it is necessary to determine such an abnormality at an early time. Known technologies for detecting an abnormality as mentioned above are, for example, a technology disclosed in Japanese Patent Application Laid-Open No. 9-21312, and a technology disclosed in Japanese Patent Application Laid-Open No. 9-125945.

In the former technology, a pressure sensor is disposed between the open-close valve and the air pump in the secondary air supply passage, and the pressure value detected by the sensor is used as a basis for detecting an abnormality in the secondary air supply apparatus. In the latter technology, a pressure sensor is disposed in the secondary air supply passage, and an abnormality in the secondary air supply apparatus is detected on the basis of a difference between the detected maximum and minimum values of pressure pulsation.

However, according to these technologies, although an abnormality of the secondary air supply apparatus can be detected, it is difficult to precisely determine which one of the component elements is abnormal. Furthermore, in the case of a malfunction where a component element does not normally function but the pressure value or the pressure pulsation value is normal, the abnormality cannot be detected.

SUMMARY OF THE INVENTION

It is an object of the invention to provide a secondary air supply apparatus and method capable of precisely determining whether a component element has an abnormality and of detecting a malfunction thereof.

A first aspect of the invention is a secondary air supply apparatus that includes a secondary air supply passage for supplying a secondary air to an upstream side of an emission control device in an exhaust system of an internal combustion engine, an opening-closing device that opens and closes the secondary air supply passage, and a check valve disposed downstream of the opening-closing device. The secondary air supply apparatus further includes a pressure sensor disposed in the secondary air supply passage, and an abnormality detecting portion that detects an abnormality of a component element based on a pressure value detected by the pressure sensor, and a pressure variation value, e.g. a variation value of the detected pressure.

According to the first aspect of the invention, the pressure value and the pressure variation value are checked by the pressure sensor. In accordance with a combination of the values, a failure mode of various component elements can be determined in a detailed manner.

The abnormality detecting portion may detect a failure mode of the component element from a combination of a pressure behavior pattern occurring at a time of a secondary air supply control and a pressure behavior pattern occurring at a time of a secondary air supply stop control. Utilizing of combinations of pressure behavior patterns at the time of the supply control and at the time of the stop control, it becomes possible to realize further detailed determination.

In a preferred form of the invention, an air pump may be disposed upstream of the opening-closing device, and the pressure sensor may be disposed at an intermediate position between the air pump and the opening-closing device. Disposing the pressure sensor at an intermediate position between the air pump and the opening-closing device makes it easier to detect an abnormality of the opening-closing device and an abnormality of the air pump separately.

If an absolute pressure sensor is employed as the pressure sensor, the abnormality detecting portion may store a detection value detected by the pressure sensor immediately before a startup of the engine, as an atmospheric pressure. With this construction, the relative pressure can be attained at the time of detection of an abnormality, and the pressure sensor can be used as an atmospheric pressure sensor at the time of stop of the secondary air supply system.

In a preferred form of the invention, the abnormality detecting portion may further have a function of monitoring an amount of flow through the air pump from an output value from the pressure sensor. If the secondary air supply apparatus downstream of the air pump is normal, a predetermined relationship is maintained between the amount of ejection flow from the air pump and the pressure value, so that the amount of ejection flow can be estimated from the pressure value.

The abnormality detecting portion may detect clogging of the secondary air supply passage by detecting an ejection pressure of the air pump while driving the air pump at a time of an opening control of the opening-closing device and at a time of a closing control of the opening-closing device. If the secondary air supply passage is clogged, a case may occur in which at the time of supply of secondary air, the air pump has an abnormality and therefore does not provide a sufficient amount of ejection flow, but the pressure behavior appears as a normal behavior. However, in the aforementioned construction, the air pump is driven at the time of the closing control, so that a reduction in the ejection pressure is detected. Therefore, it is possible to simultaneously determine whether the air pump has an abnormality and whether the secondary air supply apparatus is clogged.

The secondary air supply apparatus may further include an air-fuel ratio sensor disposed in the exhaust system, and an output of the air-fuel ratio sensor may be input to the abnormality detecting portion. By checking the air-fuel ratio in the exhaust system, it is possible to determine whether the secondary air supply is normally conducted.

In this case, abnormality determination may be based on a difference between an actual air-fuel ratio and a target air-fuel ratio in accordance with an amount of intake air, or on a difference between an actual air-fuel ratio and an expected air-fuel ratio in accordance with an engine cooling water temperature, or on a difference between an air-fuel ratio at a time of a secondary air supply control and an air-fuel ratio at a time of a stop control.

The secondary air supply control is performed at the time of a cold startup, and a certain amount of time following the startup is needed before the air-fuel ratio sensor activates. Therefore, in a preferred form of the invention, the abnormality detecting portion may determine whether the air-fuel ratio sensor has activated, by forcibly temporarily turning off the secondary air supply control.

Furthermore, the pressure sensor may be disposed between the opening-closing device and the check valve. In this case, it becomes possible to detect an abnormality of the check valve based on the pressure variation value and the pressure value detected by the pressure sensor while the opening-closing device is in a closure control state.

A second aspect of the invention is a method for detecting an abnormality of a secondary air supply apparatus for supplying a secondary air to an upstream side of an emission control device in an exhaust system of an internal combustion engine. The method includes a step of detecting a pressure value in the secondary air supply passage, a step of calculate a variation value of the pressure value, and a step of detecting an abnormality of a component element based on the pressure value and the pressure variation value.

The method according to the second aspect may be applied to a secondary air supply apparatus that includes a secondary air supply passage for supplying a secondary air to an upstream side of an emission control device in an exhaust system of an internal combustion engine, an opening-closing device that opens and closes the secondary air supply passage, a check valve disposed downstream of the opening-closing device, and a pressure sensor disposed in the secondary air supply passage.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
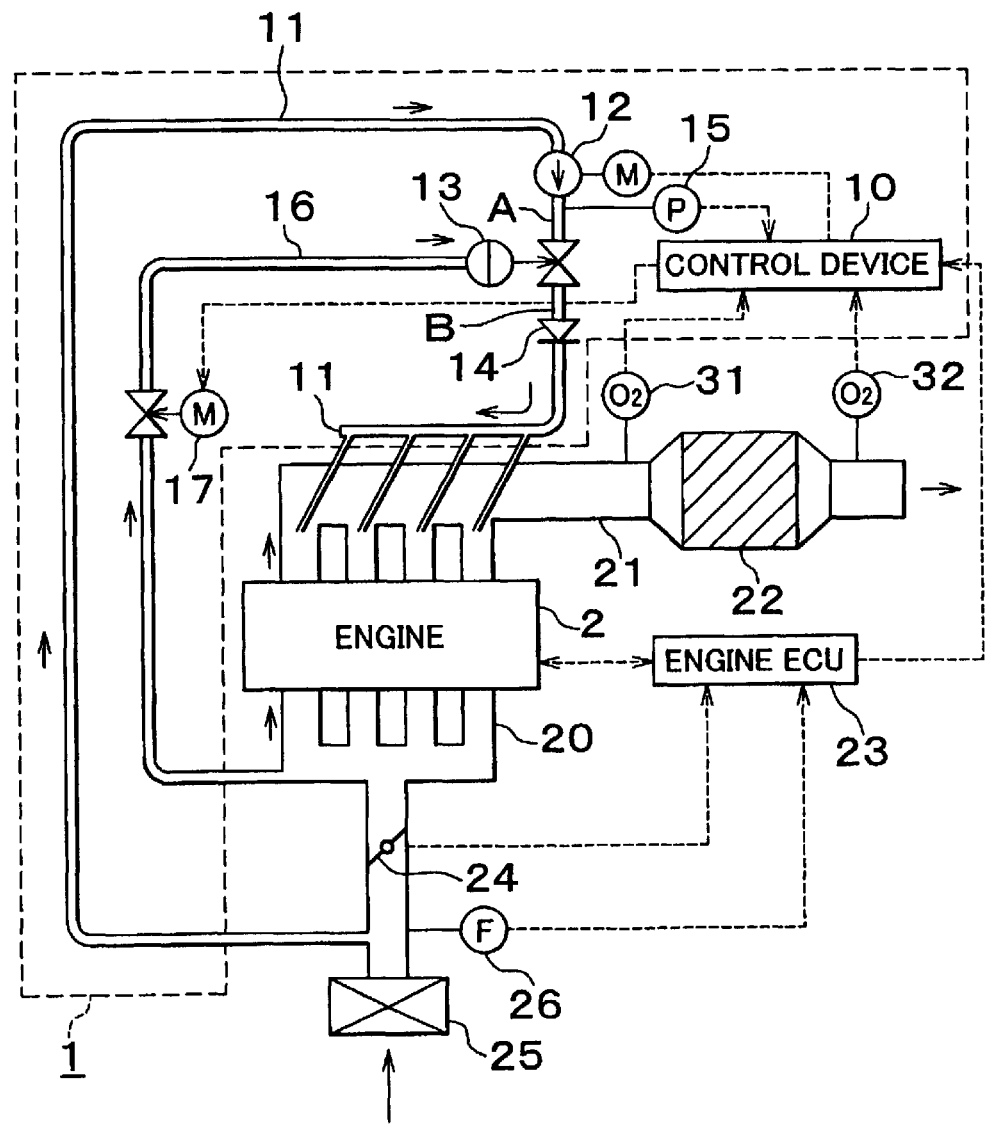
FIG. 1 is a schematic diagram illustrating a secondary air supply apparatus in accordance with an embodiment of the invention.

Preferred embodiments of the invention will be described with reference to the accompanying drawings. To facilitate the understanding of the description, like numerals are used to represent like elements in the drawings as much as possible, and repetitive descriptions will be avoided.

FIG. 1 is a schematic diagram illustrating a construction of a secondary air supply apparatus in accordance with the invention. A secondary air supply apparatus 1 is attached to a multi-cylinder gasoline engine (hereinafter, simply referred to as "engine"), which is an internal combustion engine. An intake pipe 20 and an exhaust pipe 21 are connected to the engine 2. The intake pipe 20 is provided with a throttle 24, and is connected to an intake filter 25. An air flow meter 26 for measuring the amount of air (amount of first air) is disposed between the intake filter 25 and the throttle 24. An emission control device 22 having a three-way catalyst is disposed in a downstream portion of the exhaust pipe 21. $O_2$ sensors 31, 32 for detecting the oxygen concentration in exhaust are disposed upstream and downstream of the emission control device 22. Instead of the $O_2$ sensors, it is possible to use A/F sensors, linear $O_2$ sensors, etc.

The secondary air supply apparatus 1 has a secondary air supply passage 11 that connects a portion of the intake pipe 20 and the throttle 24 to a portion of the exhaust pipe 21 between the engine 2 and the upstream-side $O_2$ sensor 31. Disposed on the secondary air supply passage 11 are an electric motor-driven air pump (AP) 12, an air switching valve (ASV) 13, and a reed valve (RV) 14 (check valve) in that order from the side of the intake pipe 20. A pressure sensor 15 is disposed between the AP 12 and the ASV 13. A pipe 16 extending from a portion of the intake pipe 20 downstream of the throttle 24 is connected to the ASV 13. The pipe 16 is provided with an electromagnetic valve 17.

A control device 10 for controlling the operation of the secondary air supply apparatus 1 is connected to an engine ECU 23 that controls the engine 2 in a fashion that allows exchange of information. The control device 10 accepts input of signals output from the pressure sensor 15 and $O_2$ sensors 31, 32, and controls the motor driving of the AP 12 and the opening and closing of the electromagnetic valve 17. The control device 10 may form a portion of the engine ECU 23.

In a state where at the time of a cold startup or the like, the fuel concentration is high, and the air-fuel ratio (A/F) is small, and the temperature of the emission control device 22 is not sufficiently high to sufficiently perform its function, the secondary air supply apparatus 1 opens the ASV 13 by the control device 10 opening the electromagnetic valve 17 so as to lead negative pressure in the intake pipe 20 into the ASV 13. Furthermore, the air pump 12 is driven to lead a portion of the air passed through the intake filter 25 into the exhaust pipe 21 via the secondary air supply passage 11, so that the oxygen concentration in exhaust gas increases and the A/F ratio of the exhaust gas rises. Thus, secondary combustion of HC and CO present in exhaust gas in the exhaust pipe 21 is accelerated for the purpose of cleaner emission. Still further, since the exhaust temperature is thus raised, temperature increase of the three-way catalyst of the emission control device 22 is accelerated, and therefore emission deterioration is reduced. Instead of the combination of the ASV 13 and the electromagnetic valve 17, it is possible to use an electromagnetic valve as an ASV 13.

The secondary air supply apparatus 1 in accordance with the invention is characterized by having a function of detecting an abnormality of component elements of the apparatus 1, that is, the air pump 12, the ASV 13, the RV 14, etc. Specifically, the control device 10 performs abnormality detection regarding the component elements based on the pressure behavior detected by the pressure sensor 15 disposed on the secondary air supply passage 11. Hereinafter, routines for this abnormality detection will be described in detail.

A first abnormality detection process routine will be described below. Before detailed description of this process, the pressure behavior in the secondary air supply passage 11 will be briefly described.

Figure 2:
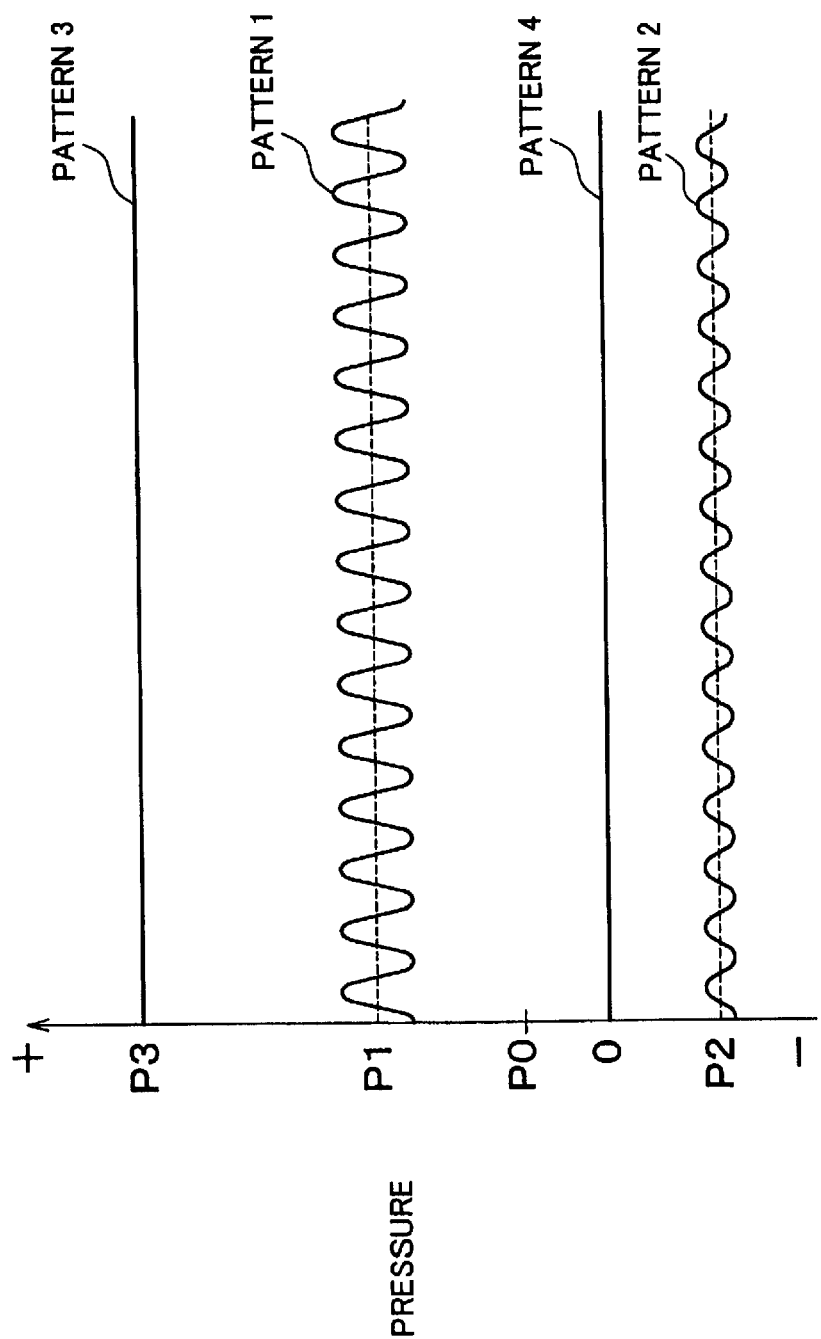
FIG. 2 is a graph indicating pressure behavior patterns at a point A indicated in FIG. 1.
Figure 3:
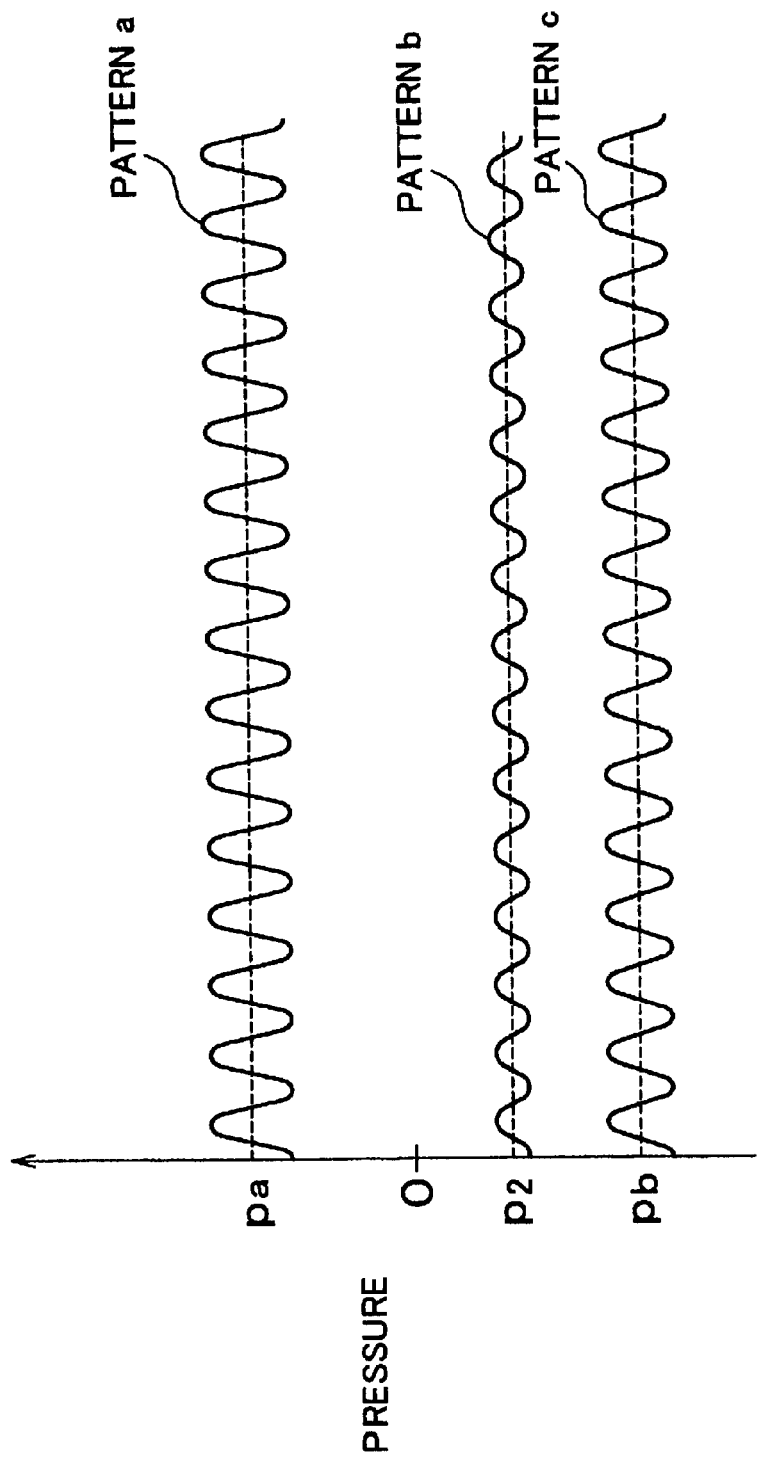
FIG. 3 is a graph indicating pressure behavior patterns at a point B indicated in FIG. 1.

FIGS. 2 and 3 are graphs schematically indicating conceivable patterns of the pressure behavior at points A and B in FIG. 1. It is assumed herein that the RV 14 normally functions. In FIG. 1, the point A is located at a site between the air pump 12 and the ASV 13 at which the pressure sensor 15 is disposed in this embodiment, and the point B is located between the ASV 13 and the RV 14. Table 1 shows combinations of operational states of the air pump 12 and the ASV 13, and pressure behavior patterns at the two points corresponding to the combinations of operational states.

TABLE 1

| AP | ASV | Pressure behavior pattern | |
|---|---|---|---|
| | | Point A | Point B |
| Operated | Open | 1 | a |
| Stopped | Open | 2 | b |
| Operated | Closed | 3 | c |
| Stopped | Closed | 4 | c |

Therefore, the operational states of the air pump 12 and the ASV 13 can be estimated from the pressure behavior pattern.

Figure 4:
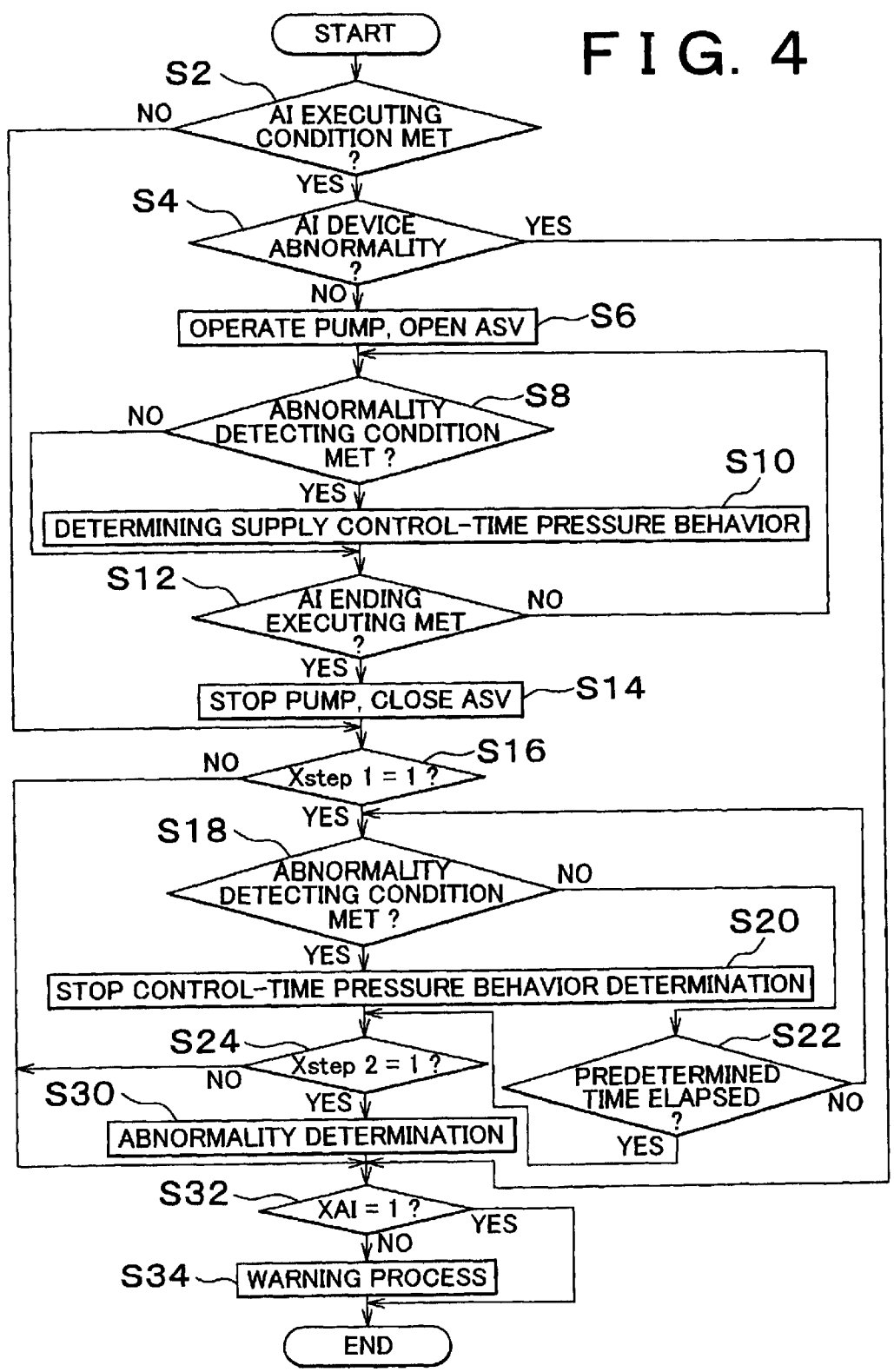
FIG. 4 is a main flowchart illustrating a first abnormality detecting routine performed in the apparatus shown in FIG. 1.
Figure 5:
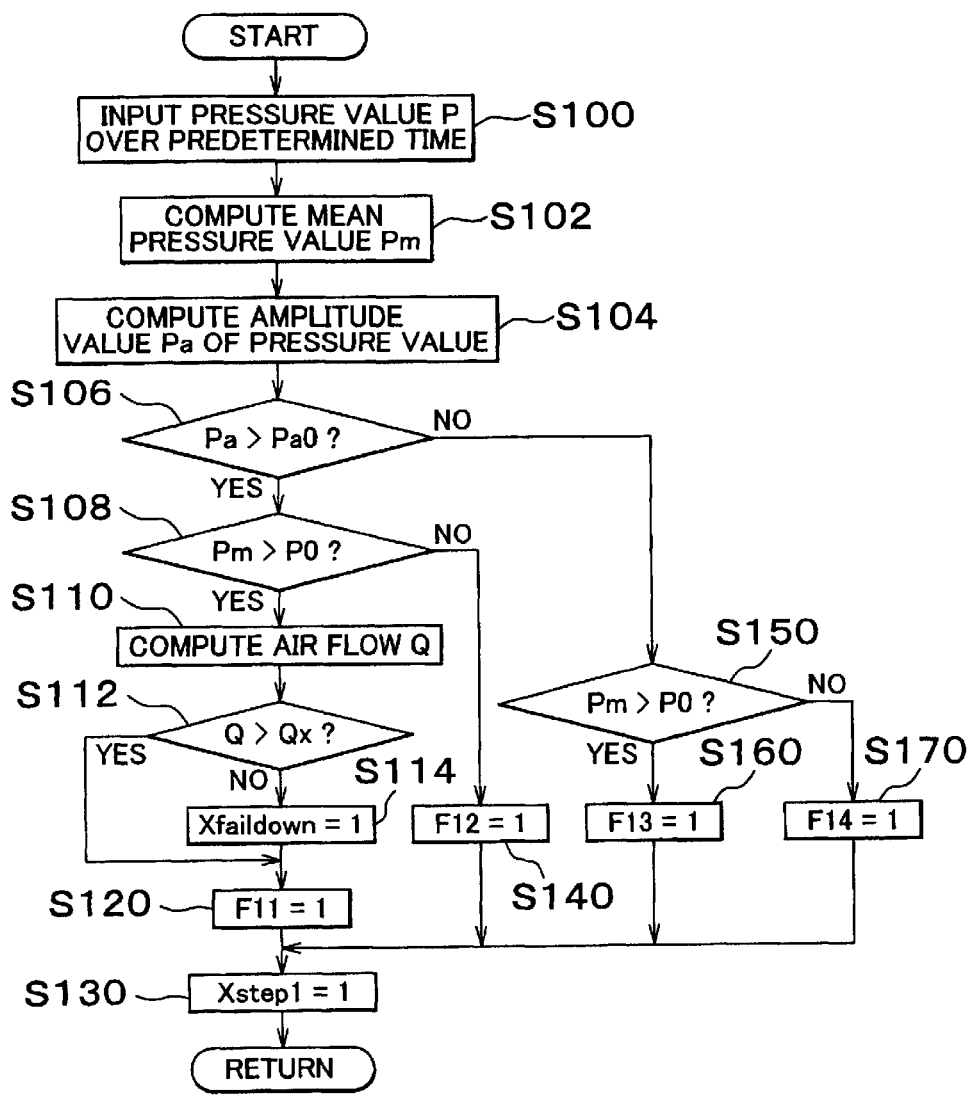
FIG. 5 is a flowchart detailing a portion of the process illustrated in FIG. 4.
Figure 6:
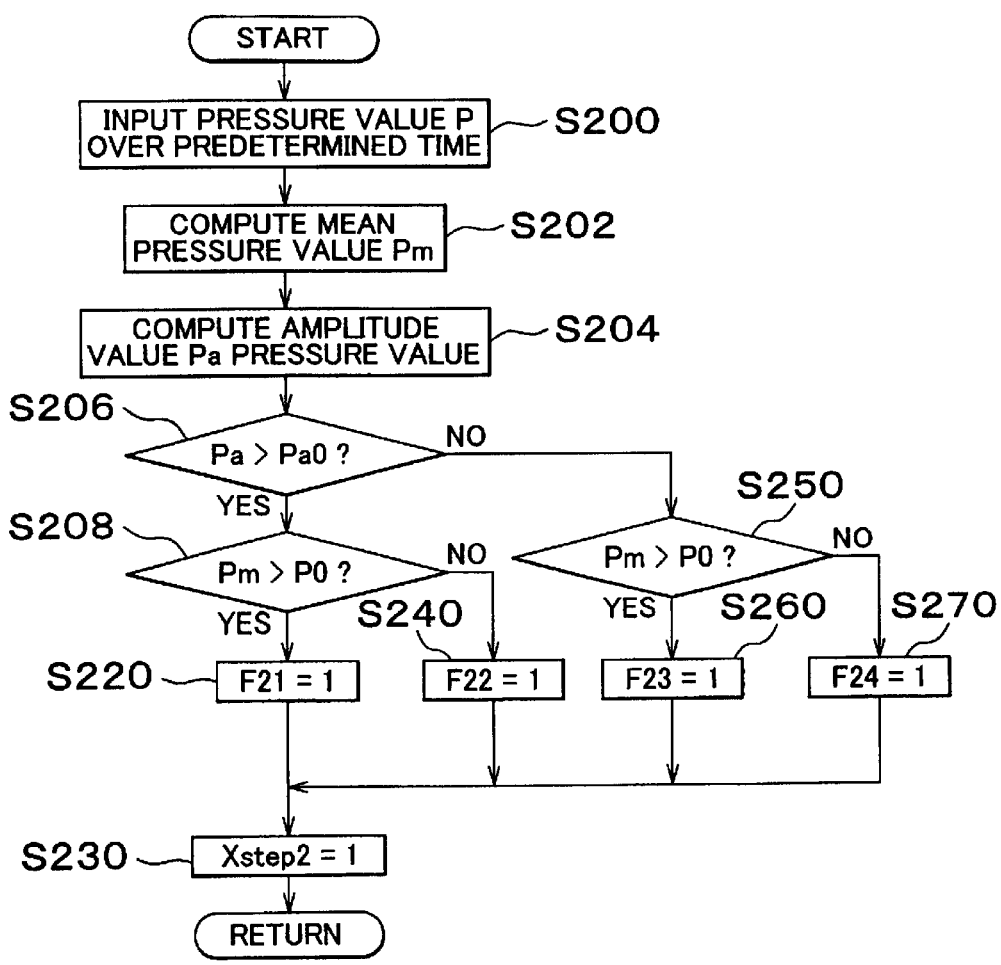
FIG. 6 is a flowchart detailing another portion of the process illustrated in FIG. 4.
Figure 7:
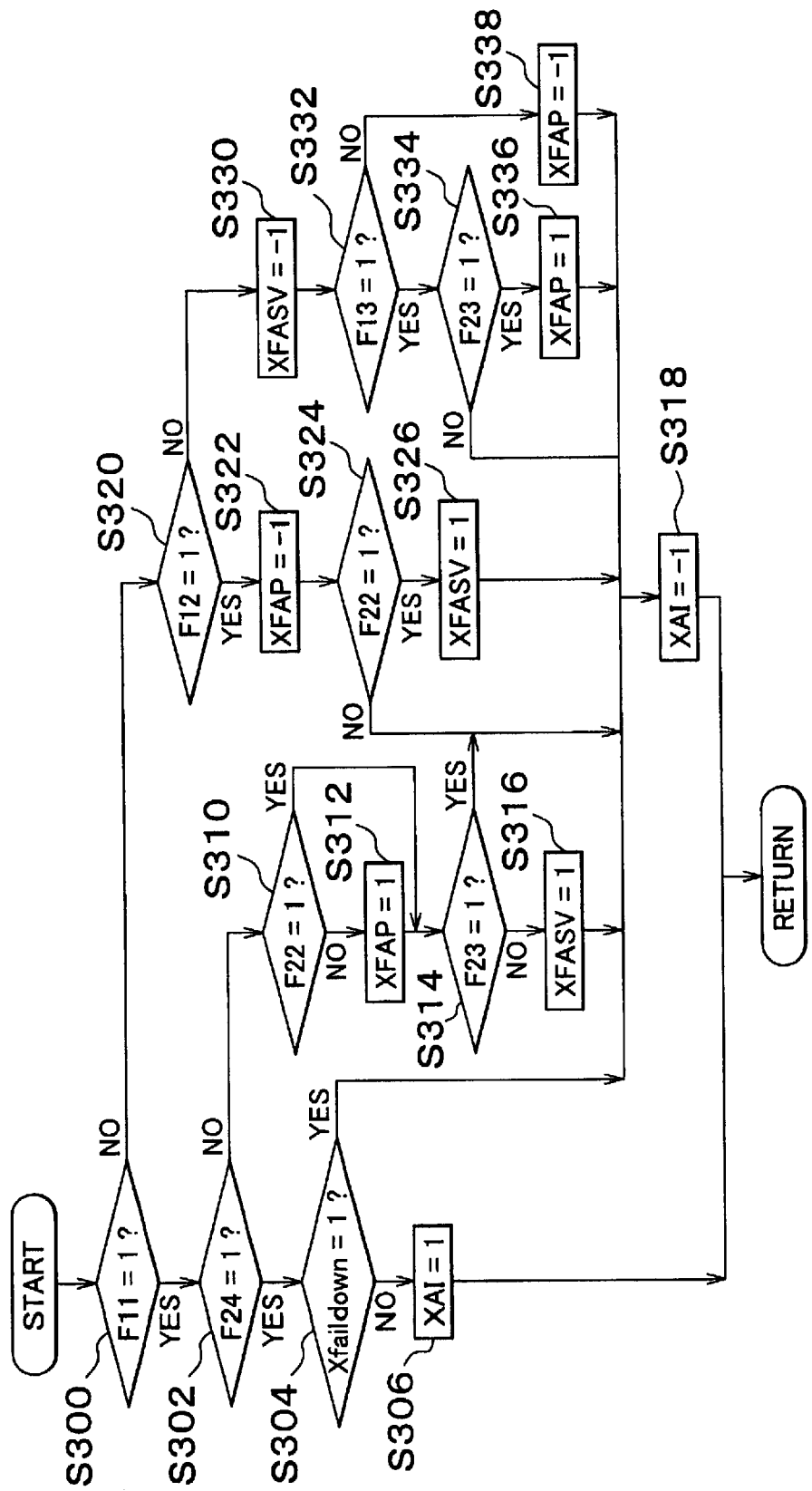
FIG. 7 is a flowchart detailing still another portion of the process illustrated in FIG. 4.

Next, the first abnormality detection routine will be described with reference to the flowcharts of FIGS. 4 to 7. FIG. 4 is a main flowchart of this routine. FIGS. 5 to 7 are flowcharts illustrating details of sub-routine of the routine illustrated in FIG. 4. The process illustrated in FIG. 4 is, basically, executed once at the time of startup by the control device 10. Each of the processes illustrated in FIGS. 5 to 7 is invoked once from the main process illustrated in FIG. 4.

First, in step S2 in FIG. 4, the control device 10 checks whether a condition for executing a secondary air supply control (simply referred to as "AI" in the flowcharts and the below description) is met. The AI executing condition is determined by the engine cooling water temperature, the intake temperature, the elapsed time following startup, the battery voltage, the load condition, etc. sent from the engine ECU 23. If the AI executing condition is not met and therefore it is determined that there is no need to execute the AI, the control device 10 goes to step S16, skipping a portion of the process. If the AI executing condition is merely yet to be met and it will become necessary to execute the AI after elapse of some time, the process waits in step S2 until the condition is met. If the AI executing condition is met, the process proceeds to step S4.

In step S4, it is checked whether an abnormality of an AI appliance has been detected. Preferably, a flag for indicating an abnormality of an AI appliance described below is not reset even if the accessory power of the vehicle has been turned off, and is reset only when an AI appliance is subjected to check and maintenance. If an abnormality has been detected, the control device 10 goes to step S32, skipping some processes. Therefore, it is possible to prevent a trouble that would otherwise be caused by an attempt to actuate the AI appliance with an abnormality found.

If it is determined in step S4 that an abnormality of the AI appliance has not been detected, the process proceeds to step S6, in which the control device 10 operates the air pump 12, and opens the ASV 13. Subsequently in step S8, it is determined whether an abnormality detecting condition is met. The abnormality detecting condition refers to a condition that a predetermined time has elapsed following execution of the AI control and the operation of the air pump 12 is stable, and the engine 2 is in an idling state based on the load and the rotation speed of the engine 2, and the vehicle speed, and therefore abnormality detection is easy. If the abnormality detecting condition is met, the process proceeds to step S10, in which the control device 10 determines a pressure behavior pattern at the time of a supply control.

In the supply control-time pressure behavior determining process (step S10), the control device 10 takes time-dependent changes in the value P of pressure detected by the pressure sensor 15 over a predetermined time. Subsequently in step S102, a mean value Pm thereof is computed. Subsequently in step S104, a value Pa of amplitude of pulsation of the pressure value P.

Figure 8:
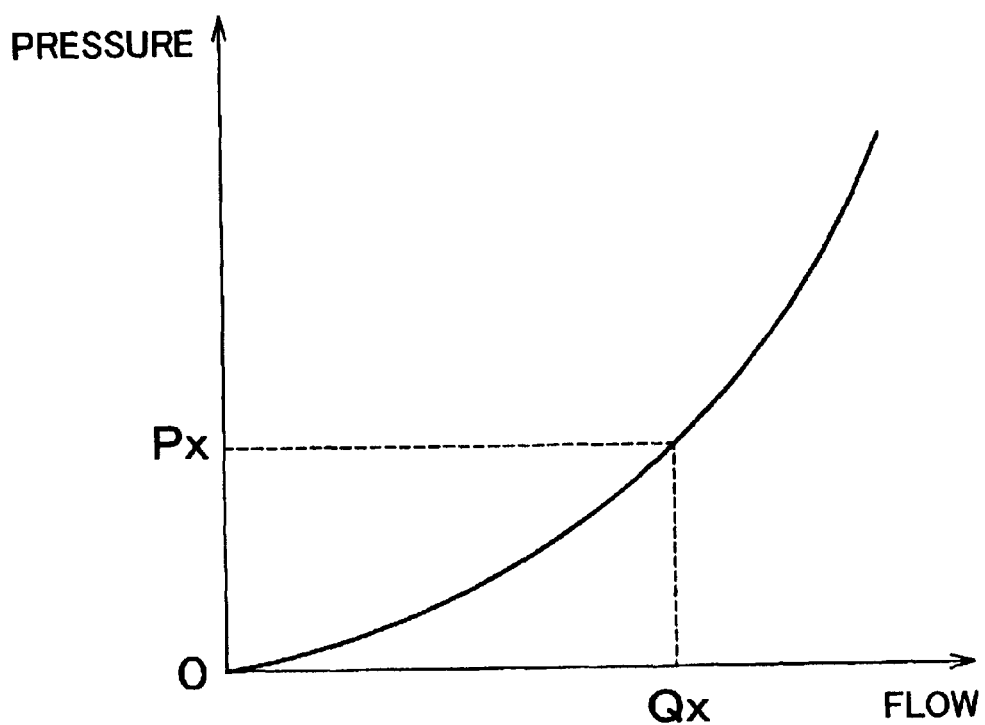
FIG. 8 is a diagram indicating a relationship between the amount of flow of an air pump and the ejection pressure thereof.

In step S106, the amplitude value Pa of pulsation of the pressure value P is compared with a threshold value Pa0. If Pa is greater than Pa0, it is determined that the present pressure behavior pattern is one of patterns 1 and 2 with great pulsations indicated in FIG. 2. After that, the process proceeds to step S108. In step S108, the mean pressure value Pm is compared with a threshold value P0. If Pm is greater than P0, the present pressure behavior pattern is pattern 1, and therefore it is considered that secondary air supply is being conducted. The process proceeds to step S110, in which the amount of supply air Q is checked. The ejection pressure of the air pump 12 and the amount of air fed have a relationship as indicated in FIG. 8. The amount of air fed can be estimated from the ejection pressure (the mean value Pm of measured values provided by the pressure sensor 15 in reality). If the amount of air fed is less than Qx indicated in FIG. 8, there is a possibility of a high fuel concentration remaining in exhaust gas, and therefore the emission may deteriorate. In step S112, it is checked whether the estimated amount of air fed Q is greater than Qx. It is also possible to compare an ejection pressure value with a threshold value Px.

If it is determined in step S112 that the amount of air fed Q is equal to or less than Qx, the process proceeds to step S114, in which "1" is set in a flag Xfaildown. Subsequently, the process proceeds to step S120. If it is determined that the amount of air fed Q is greater than Qx, the process immediately proceeds to step S120. In step S120, "1" is set in a flag Xstep1. Subsequently, this sub-routine ends.

If the Pm is equal to or less than P0 in step S106, it is determined that the present pressure behavior pattern is pattern 2. Subsequently in step S140, "1" is set in a flag F12. After the processing of step 130, this sub-routine ends.

If it is determined in step S106 that Pa is not greater than Pa0, it is considered that the present pressure behavior pattern is one of patterns 3 and 4 with no pulsation as indicated in FIG. 2. Then, the process proceeds to step S150. In step S150, Pm is compared with P0 as in step S108. If Pm is greater than P0, it is determined that the present pressure behavior pattern is pattern 3. Then, the process proceeds to step S160, in which "1" is set in a flag F13. After step S130 is executed, the sub-routine ends.

Conversely, if it is determined in step S150 that Pm is not greater than P0, it is determined that the present pressure behavior pattern is pattern 4. Then, the process proceeds to step S170, in which "1" is set in a flag F14. After execution of step S130, the sub-routine ends.

After the sub-routine illustrated in FIG. 5 ends, the process proceeds to step S12 in the main flowchart of FIG. 4, in which it is determined whether an AI ending condition is met. If the AI ending condition is not met, the control device 10 returns to step S8 to repeat the process starting at step S8. If it is determined in step S8 that the abnormality detecting condition is not met, the control device 10 proceeds to step S12, skipping the pressure behavior determination of step S10. Therefore, it is possible to improve the precision and the determination success rate of the pressure behavior pattern determination during execution of the AI control.

If it is determined in step S12 that the AI ending condition is met, the process proceeds to step S14, in which the air pump 12 is stopped and the ASV 13 is closed to stop the AI control. Then, the process proceeds to step S16, in which it is checked whether the pressure behavior determination at step S10 has ended, by checking the value of the flag Xstep1. Xstep1 being other than "1" means that the determination of a pressure behavior pattern at the time of supply control is not completed. In that case, therefore, the control device 10 goes to step S32, skipping the determining process. Conversely, Xstep1 being "1" means that the determination of a pressure behavior pattern at the time of the supply control has ended. In that case, therefore, the control device 10 proceeds to the subsequent step S18. In step S18, it is checked whether an abnormality detecting condition for performing a stop control-time pressure behavior determination (step S20) is met. If the abnormality detecting condition is met, the process proceeds to step S20, in which the stop control-time pressure behavior determination is performed.

The sub-routine of the stop control-time pressure behavior determining process (step S20) illustrated in FIG. 6 is similar to the sub-routine of the control-time pressure behavior determining process illustrated in FIG. 5. First, in step S200, the control device 10 takes time-dependent changes in the pressure value P detected by the pressure sensor 15 over a predetermined time. Subsequently, the mean value Pm of the pressure is computed (step S202), and the amplitude value Pa of pulsation of the pressure value P is computed (step S204).

In step S206, Pa is compared with Pa0. If Pa is greater than Pa0, it is determined that the present pressure behavior pattern is one of patterns 1 and 2 with great pulsation indicated in FIG. 2. Then, the process proceeds to step S208. In step S208, the mean value Pm of the pressure is compared with a threshold value P0. If Pm is greater than P0, it is determined that the present pressure behavior pattern is pattern 1. Then, the process proceeds to step S220, in which "1" is set in a flag F21.

If Pm is not greater than P0 in step S208, it is determined that the present pressure behavior pattern is pattern 2. Then, the process proceeds to step S240, in which "1" is set in a flag F22.

If Pa is not greater than Pa0 in step S206, it is determined that the present pressure behavior pattern is one of patterns 3 and 4 without pulsation indicated in FIG. 2. Then, the process proceeds to step S250. In step S250, Pm and P0 are compared as in step S208. If Pm is greater than P0, it is determined that the present pressure behavior pattern is pattern 3. Then, the process proceeds to step S260, in which "1" is set in a flag F23.

Conversely, if Pm is not greater than P0 in step S250, it is determined that the present pressure behavior pattern is pattern 4. Then, the process proceeds to step S270, in which "1" is set in a flag F24.

After the flag F21 to F24 is set, the process proceeds to step S230, in which "1" is set in a flag Xstep2. Then, this sub-routine ends.

After the sub-routine of FIG. 6 ends, the process proceeds to step S24 in the main flow illustrated FIG. 4. If the abnormality detecting condition is not met in step S18, the process proceeds to step S22, in which it is checked whether a predetermined time has elapsed following the stop of the AI control. If the time has not elapsed, the control device 10 returns to step S18, so that the determination regarding the abnormality detecting condition can be attempted during the predetermined time following the stop of the AI control. If the predetermined time has elapsed, the process proceeds to step S24.

In step S24, it is checked whether the pressure behavior determination in step S20 has ended, by checking the value of the flag Xstep2. Xstep2 being other than "1" means that the determination of a pressure behavior pattern at the time of the stop control is not completed. In that case, therefore, the control device 10 goes to step S32, skipping the determining process. Conversely, Xstep2 being "1" means that the determination of a pressure behavior pattern at the time of the stop control has ended. In that case, therefore, the control device 10 proceeds to the subsequent step S30.

In step S30, determination regarding abnormality of component elements is performed based on the results of determination at steps S10 and S20. Table 2 shows normal and abnormal modes of the air pump 12 and the ASV 13 in correspondence to pressure behavior patterns occurring at the times of the supply control and the stop control.

TABLE 2

| Mode | AP | ASV | Pressure behavior pattern Supply control | Pressure behavior pattern Stop control |
|---|---|---|---|---|
| 1 | ○ | ○ | 1 | 4 |
| 2 | ○ | x Fixed open state | 1 | 2 |
| 3 | ○ | x Fixed closed state | 3 | 4 |
| 4 | x Continuously operated | ○ | 1 | 3 |
| 5 | x Continuously operated | x Fixed open state | 1 | 1 |
| 6 | x Continuously operated | x Fixed closed state | 3 | 3 |
| 7 | x Inoperative | ○ | 2 | 4 |
| 8 | x Inoperative | x Fixed open state | 2 | 2 |
| 9 | x Inoperative | x Fixed closed state | 4 | 4 |

In this table, "○" and "x" indicate normal and abnormal states of devices and the like.

In the flow of the abnormality determining process of step S30 illustrated in FIG. 7, the determination is performed based on Table 2. First, in step S300, it is checked whether the flag F11 is "1". If the flag F11 is "1" indicating that the pressure behavior pattern at the time of the supply control is pattern 1, the process proceeds to step S302, in which it is checked whether the flag F24 is "1". If the flag F24 is "1", it is indicated that the pressure behavior pattern at the time of the stop control is pattern 4. This combination of patterns is mode 1, and indicates that the air pump 12 and the ASV 13 are normal. Then, the process proceeds to step S304, in which it is checked whether the amount of flow has reduced, by checking the value of the flag Xfaildown. The flag Xfaildown being other than "1" means that an flow amount reduction has not been caused, and all devices are normal. In that case, the process proceeds to step S306, in which a diagnostic flag XAI is set at "1" indicating the normal state. After that, the sub-routine ends. Conversely, if the flag Xfaildown is "1" indicating that the amount of flow has reduced, there is a possibility of malfunction of the air pump 12. Then, the process proceeds to step S318, in which the diagnostic flag XAI is set at "−1" indicating the abnormal state. After that, the sub-routine ends.

If it is determined in step S302 that F24 is not "1", which indicates that the present mode is one of modes 2, 4 and 5 shown in Table 2, then the process proceeds to step S310. In step S310, it is checked whether the flag F22 is "1". If F22 is not "1", that is, if the present mode is mode 4 or 5, in which the pressure behavior pattern at the time of the stop control is not pattern 2, but is pattern 1 or 3, the air pump 12 is in a failure state where the pump is continuously operated. Then, the process proceeds to step S312, in which a diagnostic flag XFAP for the air pump 12 is set at "1" indicating the failure state of continuous operation. After that, the process proceeds to step S314. Conversely, if F22 is "1", that is, if the pressure behavior pattern at the time of the stop control is pattern 2, that is, if the present mode is mode 2, the air pump 12 is normal. Then, the control device 10 proceeds to step S314, skipping step S312.

Subsequently in step S314, it is checked whether the flag F23 is "1". If the flag F23 is not "1", that is, if the present mode is mode 2 or 5 in which the pressure behavior pattern at the time of the stop control is not pattern 3, but is pattern 1 or 2, the ASV 13 is in a fixed open state in which the valve is continuously open. Then, the process proceeds to step S316, in which a diagnostic flag XFASV for the ASV 13 is set at "1" indicating that the ASV 13 is in the fixed open state. Then, the process proceeds to step S318, in which the diagnostic flag XAI is set at "−1". After that, the sub-routine ends. Conversely, if F23 is "1", that is, if the pressure behavior pattern at the time of the stop control is pattern 3, that is, if the present mode is mode 4, the ASV 13 is normal. Therefore, the control device 10 proceeds to step S318, skipping step S316. After the diagnostic flag XAI is set at "−1" in step S318, the sub-routine ends.

If it is determined in step S300 that F11 is not "1", the present mode is one of modes 3 and 6 to 9. In this case, the process proceeds to step S320, in which it is checked whether the flag F12 is "1". If F12 is "1", that is, if the pressure behavior pattern at the time of supply control is pattern 2, the present mode is one of modes 7 and 8. In either one of the modes, the air pump 12 is in the inoperative state, and therefore, the diagnostic flag XFAP for the air pump 12 is set at "−1" indicating the inoperative failure state of the pump. Then, the process proceeds to step S324. Instep S324, it is checked whether the flag F22 is "1". If F22 is "1", that is, if the pressure behavior pattern at the time of the stop control is pattern 2, the present mode is mode 8 where the ASV 13 is in the fixed open state in which the valve is continuously open. Then, the process proceeds to step S326, in which the diagnostic flag XFASV for the ASV is set at "1" indicating the fixed open state. Then, the process proceeds to step S318, in which the diagnostic flag XAI is set at "−1". After that, the sub-routine ends. Conversely, if F22 is not "1", the present mode is mode 7 where the ASV 13 is normal. Then, the control device 10 skips S326, and proceeds to step S318, in which the diagnostic flag XAI is set at "−1". After that, the sub-routine ends.

If it is determined in step S320 that F12 is not "1", the present mode is mode 3, 6 or 9. In any one of the modes, the ASV 13 is in the fixed closed state where the valve is continuously closed. The process proceeds to step S330, in which the diagnostic flag XFASV of the ASV is set at "−1" indicating the fixed closed state of the valve. Subsequently in step S332, it is determined whether the flag F13 is "1". If F13 is "1", the pressure behavior pattern at the time of supply control is pattern 3, and therefore, the present mode is mode 3 or 6. In this case, the process proceeds to step S334, in which it is determined whether the flag F23 is "1". If the flag F23 is "1", the pressure behavior pattern at the time of the stop control is pattern 3, and the present mode is mode 6 in which the air pump 12 is in a failure state where the pump is continuously operated. Then, the process proceeds to step S386, in which the diagnostic flag XFAP of the air pump 12 is set at "1" indicating the failure state of continuous operation. The process proceeds to step S318, in which the diagnostic flag XAI is set at "−1". After that, the sub-routine ends. Conversely, if the flag F23 is not "1", the present mode is mode 3, in which the air pump 12 is normal. The control device 10 skips step S336, and proceeds to step S318, in which the diagnostic flag XAI is set at "−1". After that, the sub-routine ends.

If it is determined in step S332 that F13 is not "1", the present mode is mode 9 in which the air pump 12 is in the inoperative failure state. Then, the process proceeds to step S338, in which the diagnostic flag XFAP for the air pump 12 is set at "−1" indicating the inoperative failure state. Then, the process proceeds to step S318, in which the diagnostic flag XAI is set at "−1". After that, the sub-routine ends.

After the sub-routine illustrated in FIG. 7 ends, the process proceeds to step S32 shown in FIG. 4. In step S32, the value of the diagnostic flag XAI is checked. If the value of the flag is "1" indicating the normal state, step S34 is skipped, and the process ends. Conversely, if the value of the flag is "−1" indicating that the system is abnormal, or "0" indicating that the determination is not completed yet, the process proceeds to step S34, in which a display device or an alarm (not shown) is used to inform a driver that the system has an abnormality or the failure detection could not be performed. This process is termed a warning process. After that, the process ends.

This abnormality detecting routine in accordance with the invention makes it possible to precisely detect whether the air pump 12 or the ASV 13 has an abnormality, and what abnormality the component element has.

In the foregoing embodiment, the end of the AI control is followed by the stop control-time pressure behavior determining process, and then, the abnormality determining process is performed. However, it is also possible to perform abnormality determination while the condition for the AI supply control is met, by determining a pressure behavior at the time of the stop control through a forced temporary stop of the supply during the AI supply. Therefore, it becomes possible to perform diagnostics during the AI control.

Furthermore, as shown in Table 2, the pressure behavior pattern at the time of the AI supply control while the devices are normal is limited to pattern 1. Therefore, if the pressure behavior pattern at the time of the supply control is other than pattern 1, the AI control may be immediately stopped, and the process may proceed to a pressure behavior pattern at the time of stop. In particular, if the pressure behavior pattern at the time of the supply control is pattern 4, it is apparent that the present mode is mode 9 shown in Table 2. Therefore, the pressure behavior pattern determination at the time of stop may be omitted.

Furthermore, the position of the pressure sensor 15 is not limited to the point A. If the pressure sensor 15 is disposed at the point B, it is also possible to determine a failure mode of a device by a technique similar to the above-described technique. The pressure sensor 15 may be a relative pressure sensor that outputs a differential pressure relative to an atmospheric pressure, and may also be an absolute pressure sensor. In this case, it is necessary to adopt a construction in which the atmospheric pressure can be detected during a stop of operation of the secondary air system. However, in a normal type air pump 12, the housing and the pump rotor are not in close contact, and the upstream and downstream sides of the air pump 12 become communicated during the non-operation state. Thus, this type of air pump 12 allows detection of the atmospheric pressure. If such a construction is adopted, it is appropriate to use the value output before the startup of the engine as an atmospheric pressure, and compute a relative pressure from a difference regarding the atmospheric pressure. Therefore, it becomes possible to use the pressure sensor 15 as an atmospheric pressure sensor except for the occasion of detection of an abnormality of the secondary air system and the period of supply of secondary air. However, when the air pump 12 is in the failure state of continuous operation, there is a possibility of estimation of a atmospheric pressure increased by the amount of ejection pressure. In this case, therefore, it is appropriate to check and correct the electric power consumed by the air pump 12, the voltage of the air pump 12, the current through the pump, etc. During the fixed open state of the ASV 13, there is a possibility of transmission of pulsation of exhaust from the engine 2. In this case, the mean pressure is near the atmospheric pressure, and therefore, an atmospheric pressure can be detected by an averaging process.

Figure 9:
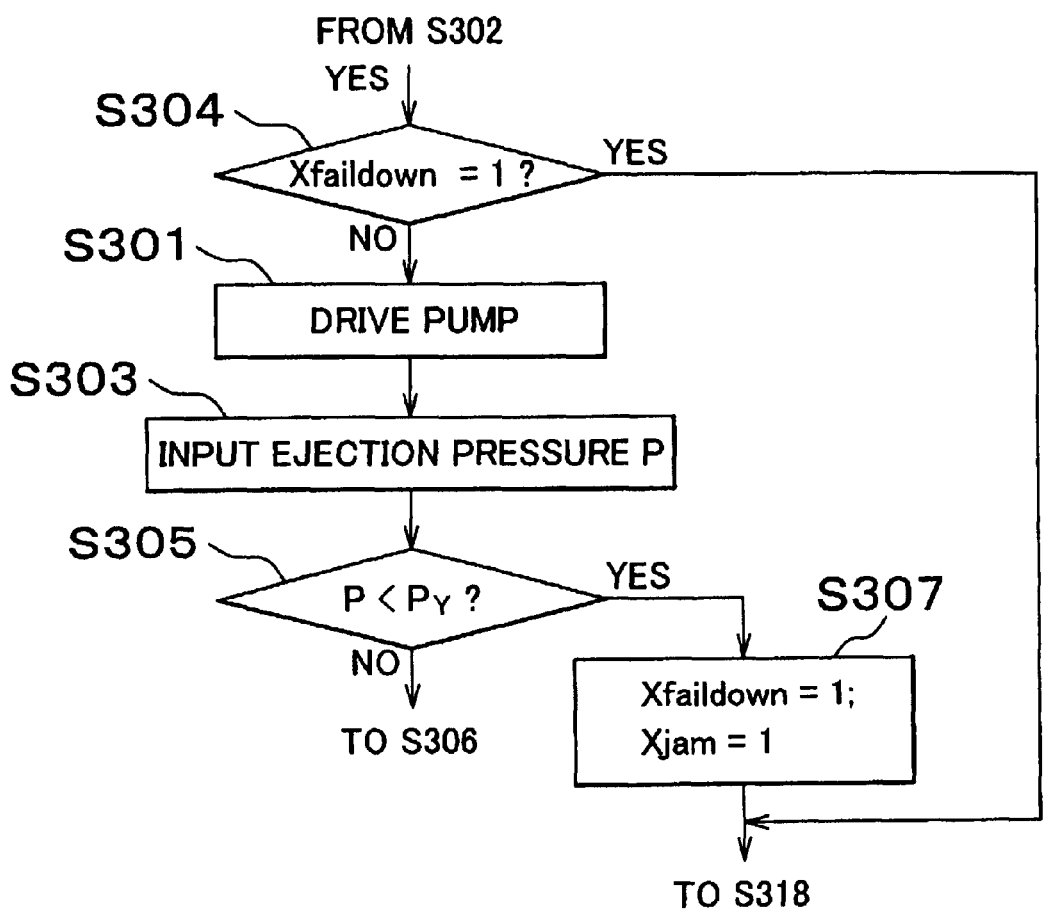
FIG. 9 is a flowchart illustrating a clogged pipe determining process that may be added to the process illustrated in FIG. 4.

It is also possible to add a piping clogging determination to the first abnormality detecting routine. FIG. 9 is a flowchart illustrating the clogging determining process. Insertion of the process between step S304 and step S306 in FIG. 7 will make it possible to perform the clogging determination in the first abnormality detecting routine.

If it is determined in step S304 that the value of the flag Xfaildown is not "1", the air pump 12 is temporarily driven (step S301) while the ASV 13 remains in the open state. The ejection pressure P of the air pump 12 is read by the pressure sensor 15 (step S303). The measured ejection pressure P is compared with a threshold value $P_Y$ (step S305). The ejection pressure P being less than $P_Y$ indicates that although the air pump 12 has a malfunction, a certain pressure value is detected at the time of the AI supply control. This indicates that due to a clogged piping downstream of the ASV 13, a certain pressure rise is exhibited despite an insufficient amount of ejection from the air pump 12. Then, the process proceeds to step S307, in which a flag Xjam that indicates a piping state is set at "1" indicating the clogging of the piping. Furthermore, in step S307, a flag Xfaildown that indicates the amount of air pump flow is set at "1" indicating a reduction in the amount of flow. Then, the process proceeds to step S318. If a sufficient pressure rise is exhibited, it is considered that there is no reduction in the amount of flow through the air pump 12 and no clogged piping, and the process proceeds to step S306. Therefore, it is possible to determine whether the secondary air supply apparatus, including the piping, has an abnormality.

Figure 10:
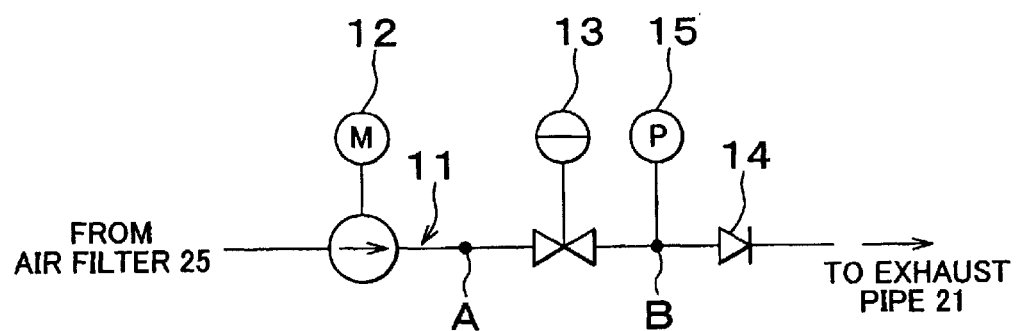
FIG. 10 is a diagram illustrating a secondary air supply apparatus that performs a second abnormality detecting routine.
Figure 11:
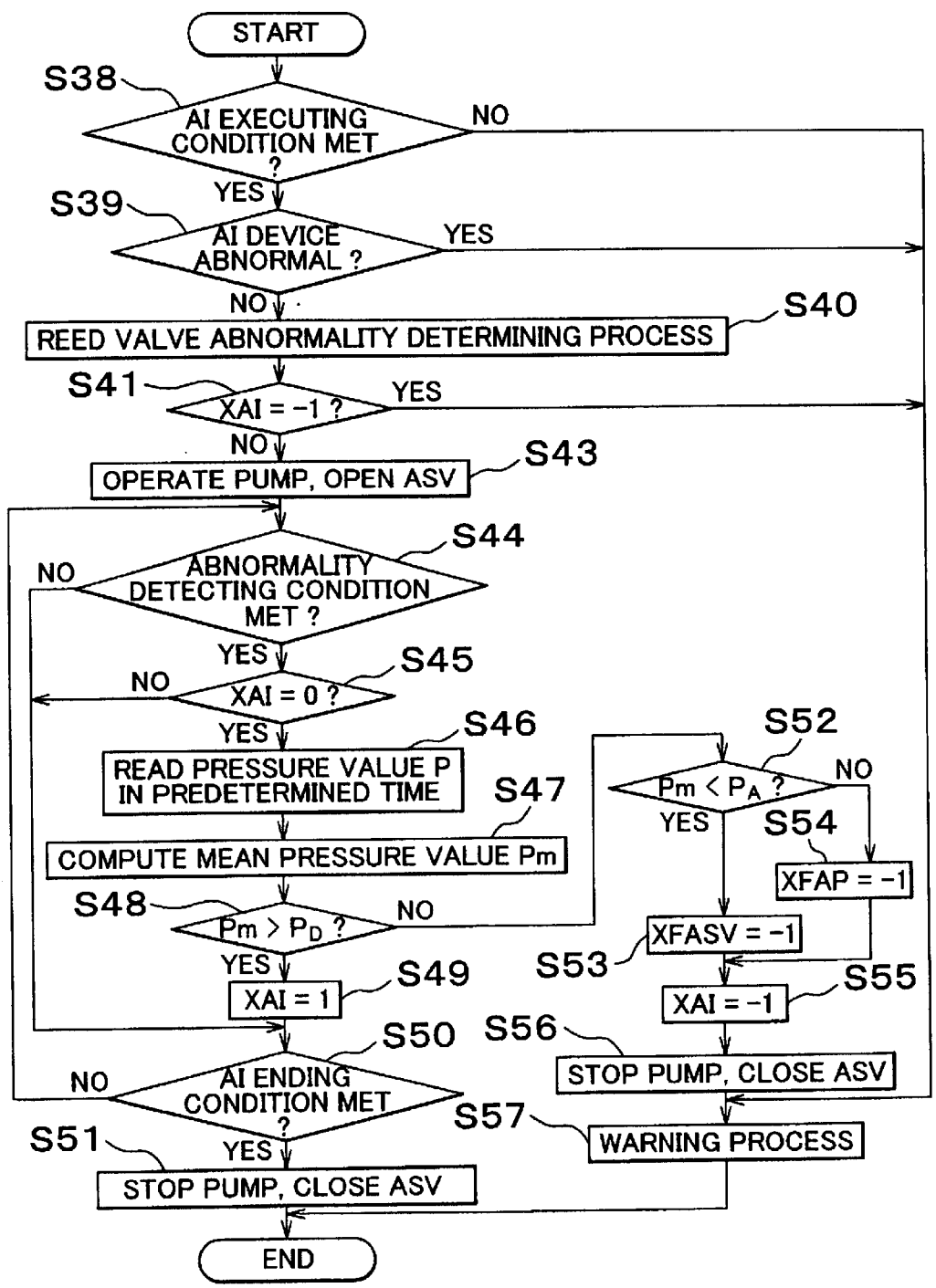
FIG. 11 is a main flowchart illustrating the second abnormality detecting routine performed in a secondary air supply system shown in FIG. 10.
Figure 12:
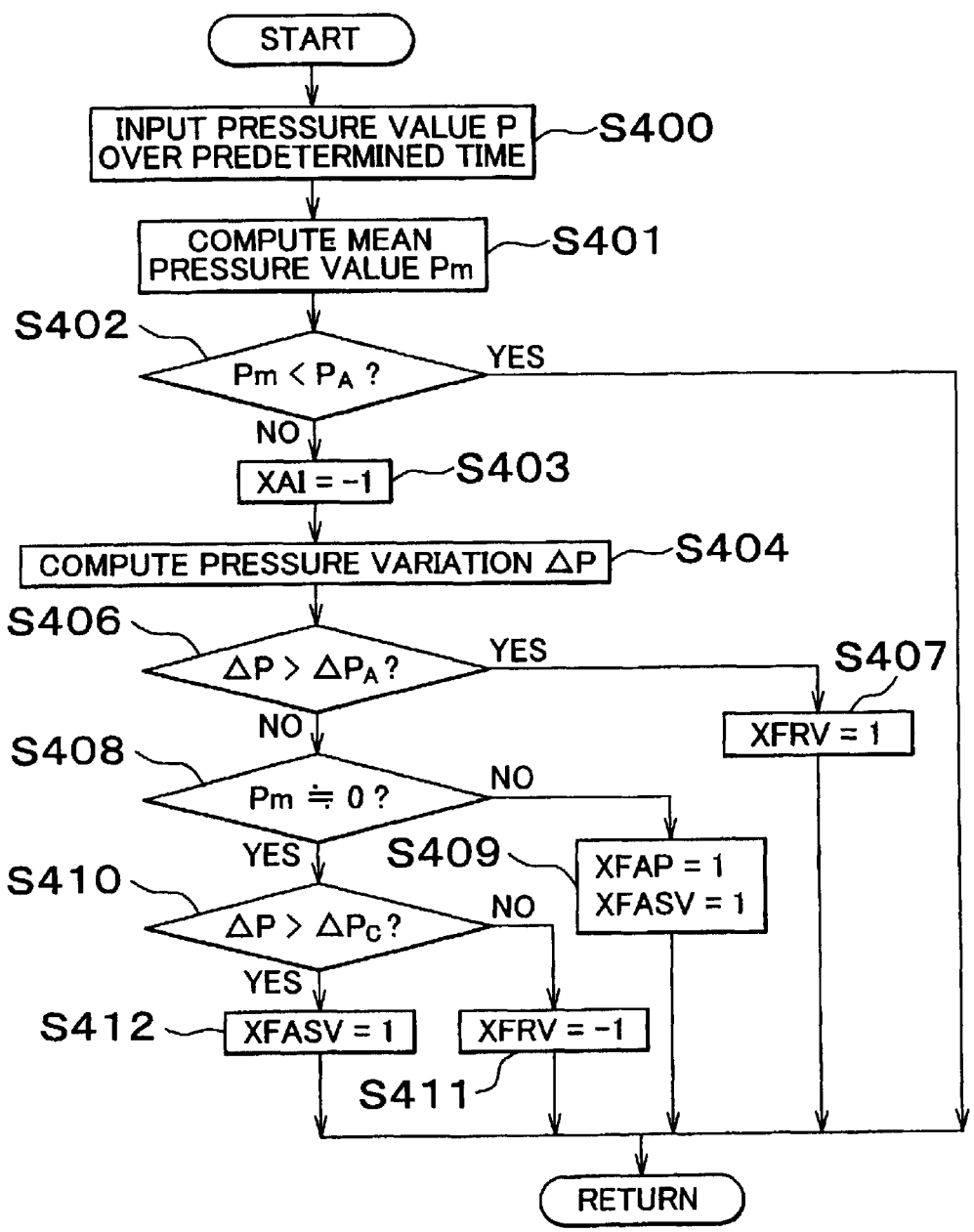
FIG. 12 is a flowchart detailing a portion of the process illustrated in FIG. 11.

Next, a second abnormality detecting routine will be described with reference to FIGS. 10 to 12. The secondary air supply apparatus in which the second abnormality detecting routine is performed differs from the secondary air supply apparatus shown in FIG. 1 in that the pressure sensor 15 is disposed at a point B as shown in FIG. 10. FIG. 11 is a main flowchart of the abnormality detecting process. FIG. 12 is a flowchart illustrating a sub-routine of a reed valve abnormality determining process.

First, in step S38, it is checked whether an AI executing condition is met. This process is substantially the same as step S2 in FIG. 4. If the condition is not met (excluding a case where the condition is yet to be met, in which case the fulfillment of the condition is awaited), the process goes to step S57, skipping the abnormality detecting process. If the condition is met, the process proceeds to step S39, in which it is checked whether an abnormality of an AI device has been detected. This process is substantially the same as step S4 in FIG. 4. If an abnormality has been detected, the process goes to step S57 described below, skipping the abnormality detecting process. Therefore, it is possible to avoid a trouble that would occur if operation of the AI is attempted with an abnormality already determined.

If it is determined in step S39 that no abnormality of an AI device has been detected, the process proceeds to step S40, in which the abnormality determining process regarding the reed valve is performed. FIG. 12 is a flowchart illustrating a reed valve abnormality determining process.

First, a fluctuation in the pressure value P in a predetermined time is input (step S400), and a mean pressure value Pm is computed (step S401). Then, the mean pressure value Pm is compared with a threshold value PA (which is a negative pressure, that is, lower than the atmospheric pressure) (step S402). Occurrence of a negative pressure means that at the point B, a minimum pressure (negative pressure) of the pressure pulsations caused within the exhaust pipe 21 by the engine 2 is held. In this case, it is determined that the RV 14 is normally functioning. Then, the process immediately ends.

If negative pressure does not exist, the process proceeds to step S403, in which the flag XAI that indicates a state of the system is set at "−1" indicating an abnormality. Then, a variation ΔP of pressure pulsation is computed (step S404). The variation ΔP is compared with a threshold value $\Delta P_A$. The variation ΔP being greater than $\Delta P_A$ means that the RV 14 is in the continuously open state, and the pressure pulsation caused within the exhaust pipe 21 by the engine 2 directly propagates to the point B. In that case, the process proceeds to step S407, in which a flag XFRV for indicating a failure state of the RV 14 is set at "1" indicating that the RV 14 is in a fixed open state. After that, the process ends.

If it is determined in step S406 that there is no pressure pulsation, the mean pressure value Pm is held near or above the atmospheric pressure. Therefore, in step S408, it is checked whether the mean pressure value Pm is near the atmospheric pressure (whether the relative pressure is near 0). If Pm is not near the atmospheric pressure, that is, if Pm is above the atmospheric pressure, the AI is operating despite a stop control state. Therefore, the flag XFAP for indicating a failure state of the air pump 12 is set at "1" indicating a continuously operated state, and the flag XFASV for indicating a failure state of the ASV 13 is set at "1" indicating a fixed open state (step S409). After that, the process ends.

If the mean pressure value Pm is near the atmospheric pressure, the process proceeds to step S410, in which ΔP is compared with another threshold value $\Delta P_C$ (where $\Delta P_C < \Delta P_A$). If ΔP is greater than $\Delta P_C$, it is determined that the ASV 13 is an open valve state and pulsation from the intake side propagates, and the flag XFASV for indicating a failure state of the ASV 13 is set at "1" indicating that the valve 13 is in the fixed open state (step S412). After that, the process ends. Conversely, if ΔP is not greater than $\Delta P_C$, it is determined that the ASV 13 and the RV 14 are in the closed valve state, and the flag XFRV for indicating a failure state of the RV 14 is set at "−1" indicating that the valve 14 is in a fixed closed state (step S411). After that, the process ends.

After the sub-routine of FIG. 12 ends, the process proceeds to step S41 in FIG. 11, in which the value of the flag XAI is checked. If the value of the flag XAI is "−1", this means that a failure of a device has been detected, and the process proceeds to step S57. If the value of the flag is not "−1" (more precisely, the value is the initial value 0 because the abnormality determining process has not ended), the process proceeds to step S43, in which the air pump 12 is operated and the ASV 13 is opened to start the AI supply. Subsequently in step S44, it is checked whether the abnormality detecting condition is met. the abnormality detecting condition is the same as the condition at step S8 in FIG. 4. If the abnormality detecting condition is not met, the process proceeds to step S50, skipping the determination.

If the abnormality detecting condition is met, the process proceeds to step S45, in which the value of the flag XAI is checked. Only if XAI is "0", that is, only if the abnormality detecting process has not been performed, the process proceeds to step S46. If a result of determination indicating the normal state has been obtained, the control device 10 goes to step S50, skipping the determining process. This process is bypassed if an abnormality exists.

In step S46, fluctuation in the pressure value P over the predetermined time is read. The mean pressure value Pm is computed (step S47). In step S48, the mean pressure value Pm is compared with a threshold value $P_D$. If Pm is greater than $P_D$, it is determined that there is a sufficient supply of secondary air, and the process proceeds to step S49, in which the diagnostic flag XAI is set at "1" indicating the normal state. In step S50, it is checked whether an AI ending condition is met. If the condition is not met, the control device 10 goes back to step S44 to repeat the process starting at step S44 and thereby continues supplying secondary air. Conversely, if the AI ending condition is met, the process proceeds to step S51, in which the air pump 12 is stopped and the ASV 13 is closed so as to stop supplying secondary air. After that, the process ends.

If it is determined in step S48 that Pm is not greater than $P_D$, the process proceeds to step S52, in which Pm is compared with $P_A$ (negative pressure that is lower than the atmospheric pressure). If Pm is smaller than $P_A$, it is determined that the ASV 13 is in the closed valve state and therefore the supply of secondary air is prevented. Then, the flag XFASV for indicating a failure state of the ASV 13 is set at "−1" indicating a fixed closed state (step S53). After that, the process proceeds to step S55. Conversely, if Pm is not less than $P_A$, it is determined that although the ASV 13 is normal and in the open valve state, the air pump 12 is at a stop, so that communication with the intake filter 25 side is established and therefore, the pressure is close to the atmospheric pressure. The flag XFAP for indicating a failure state of the air pump 12 is set at "−1" indicating an inoperative state (step S54). The process proceeds to step S55.

In step S55, the flag XAI for indicating the state of the system is set at "−1" indicating an abnormality. Subsequently in step S56, a control of stopping the air pump 12 and closing the ASV 13 is performed. In reality, supply of secondary air is impossible due to failure of one of component elements. However, in order to avoid induction of a failure of other normal device, the aforementioned process is performed. Subsequently in step S57, a display device or an alarm (not shown) is used to inform a driver that the system has an abnormality or the failure detection could not be performed, as in step S34 in FIG. 4. This process is termed a warning process. After that, the process ends.

According to this embodiment, determination regarding an abnormality of the RV 14 and an abnormality of some of the devices can be performed prior to execution of the AI control. Furthermore, during execution of the AI control, it is also possible to determine whether other devices have abnormality.

Figure 13:
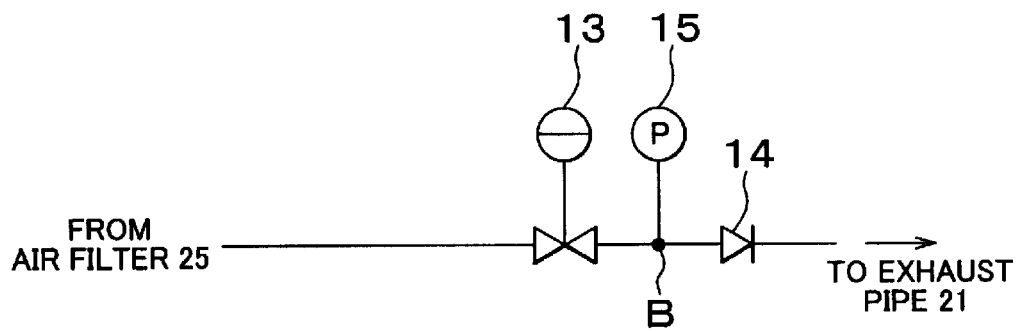
FIG. 13 is a diagram illustrating a secondary air supply apparatus that performs a third abnormality detecting routine.
Figure 14:
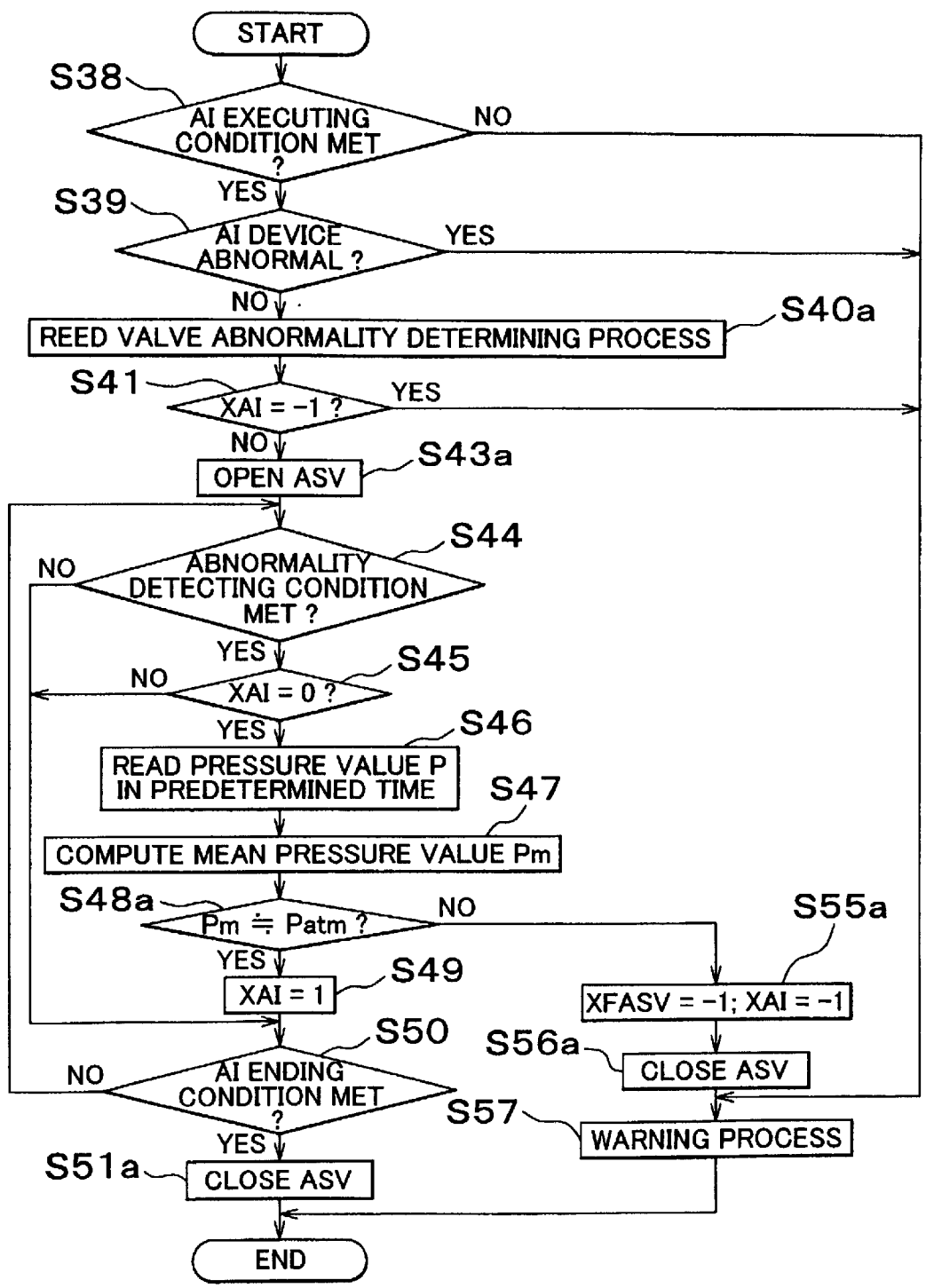
FIG. 14 is a main flowchart illustrating the third abnormality detecting routine performed in a secondary air supply system shown in FIG. 13.
Figure 15:
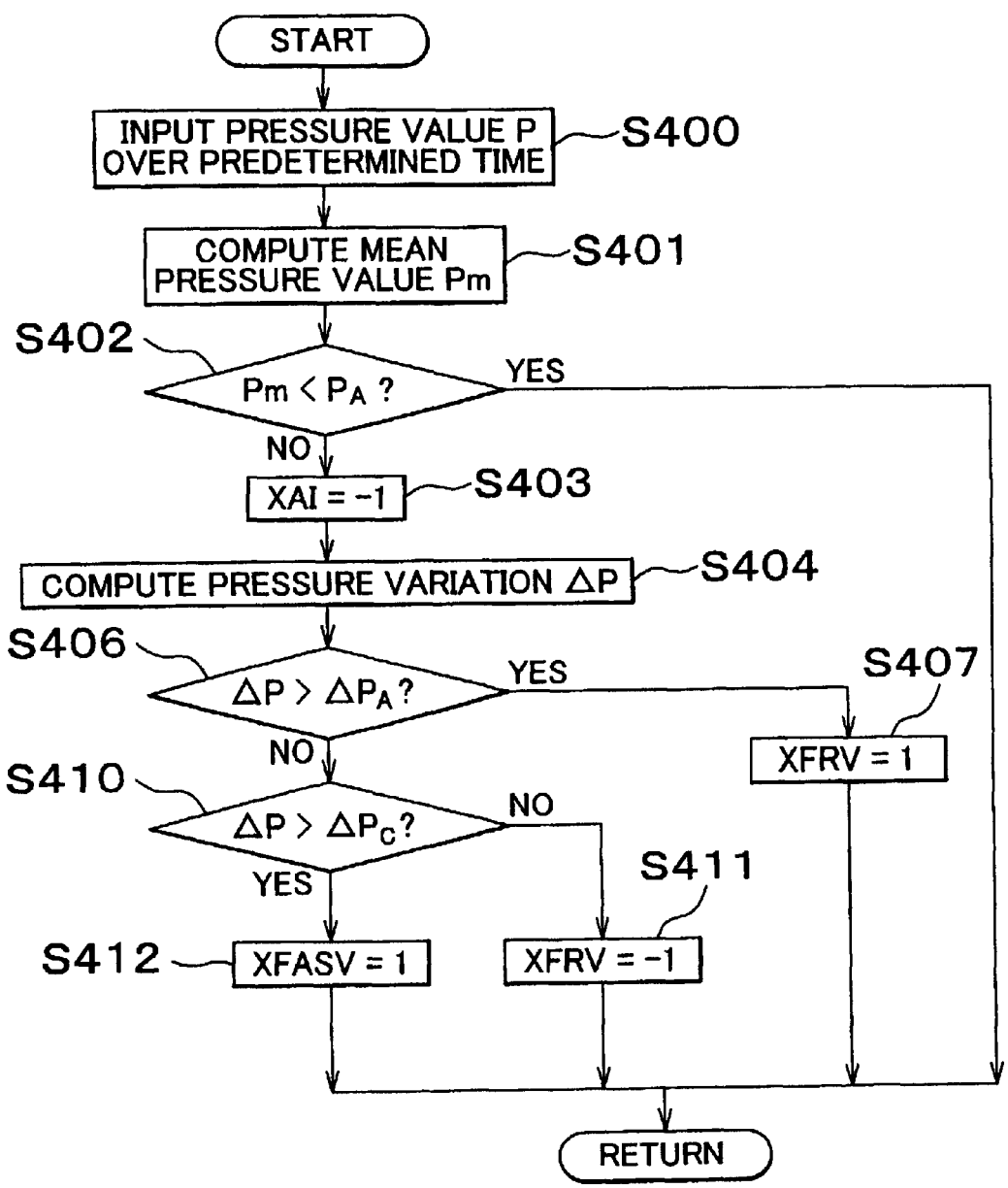
FIG. 15 is a flowchart detailing a portion of the process illustrated in FIG. 14.

Next, a third abnormality detecting routine will be described with reference to FIGS. 13 to 15. A secondary air supply apparatus in which the third abnormality detecting routine differs from the secondary air supply apparatus illustrated in FIG. 10, in that an air pump 12 is not provided as is apparent from FIG. 13. FIG. 14 illustrates a main flow of the abnormality detecting process. FIG. 15 is a flowchart illustrating a sub-routine of a reed valve abnormality determining process.

The content of the third abnormality detecting routine is substantially the same as the content of the second abnormality detecting routine. Therefore, detailed descriptions of identical portions thereof will be omitted. After the determination regarding the AI executing condition (step S38) and the determination regarding the AI device abnormality (step S39), the process proceeds to a reed valve abnormality determining process (step S40a). This abnormality determining process is illustrated by the flowchart of FIG. 15. This abnormality determining process is formed by excluding only the air pump-related steps S408 and S408 from the abnormality determining process illustrated in FIG. 12. Therefore, the content of this process will not be described in detail again.

After the sub-routine of FIG. 15 ends, the process proceeds to step S41 in FIG. 14, in which the flag XAI is checked. If the value of the flag XAI is not "−1", the ASV 13 is opened to start the AI supply (step S43a). Subsequently, it is checked whether the abnormality detecting condition is met (step S44). If the condition is not met, the process proceeds to step S50, skipping the determining process.

If the abnormality detecting condition is met, the flag XAI is checked (step S45). Only in the case where XAI is "0", the process proceeds to step S46. In the other cases, the process proceeds to step S50, skipping the determining process.

In step S46, fluctuation in the pressure value P over a predetermined time is read. Then, a mean pressure value Pm is computed (step S47). In step S48a, it is checked whether the mean pressure value Pm is near the atmospheric pressure (if Pm is relative pressure, whether Pm is near "0"). If Pm is near the atmospheric pressure, it is determined that there is a sufficient supply of secondary air. Then, the process proceeds to step S49, in which the diagnostic flag XAI is set at "1" indicating the normal state. Subsequently in step S50, it is checked whether the AI ending condition is met. If the condition is not met, the control device 10 goes back to step S44 to repeat the process starting at step S44 and continue supplying secondary air. Conversely, if the AI ending condition is met, the process proceeds to step S51a, in which the ASV 13 is closed to stop supplying secondary air. After that, the process ends.

If it is determined in step S48a that Pm is not near the atmospheric pressure, more specifically, there is great negative pressure, then it is determined that the ASV 13 is in the closed state blocking the supply of secondary air. Then, the process proceeds to step S55a, in which the flag XFASV for indicating a failure state of the ASV 13 is set at "−1" indicating that the ASV 13 in the fixed closed state, and the flag XAI for indicating a state of the system is set at "−1". In step S56a, a control of closing the ASV 13 is performed. Although in reality, the ASV 13 is in the fixed closed state, the ASV closing operation is performed in order to avoid induction of a failure of other normal devices. The subsequent process of step S57 is the same as in FIG. 11.

The third abnormality detecting routine also allows precise determination of an abnormality mode of component devices, as is the case with the second abnormality detecting routine.

A fourth abnormality detecting routine will be described with reference to FIGS. 16 to 18. This abnormality detecting routine is performed in the secondary air supply apparatus shown in FIG. 1. The fourth abnormality detecting routine performs determination regarding ejection reduction of the air pump 12 and fuel system abnormality. This abnormality detecting routine may be employed together with the first abnormality detecting routine illustrated in FIGS. 4 to 6.

Figure 16:
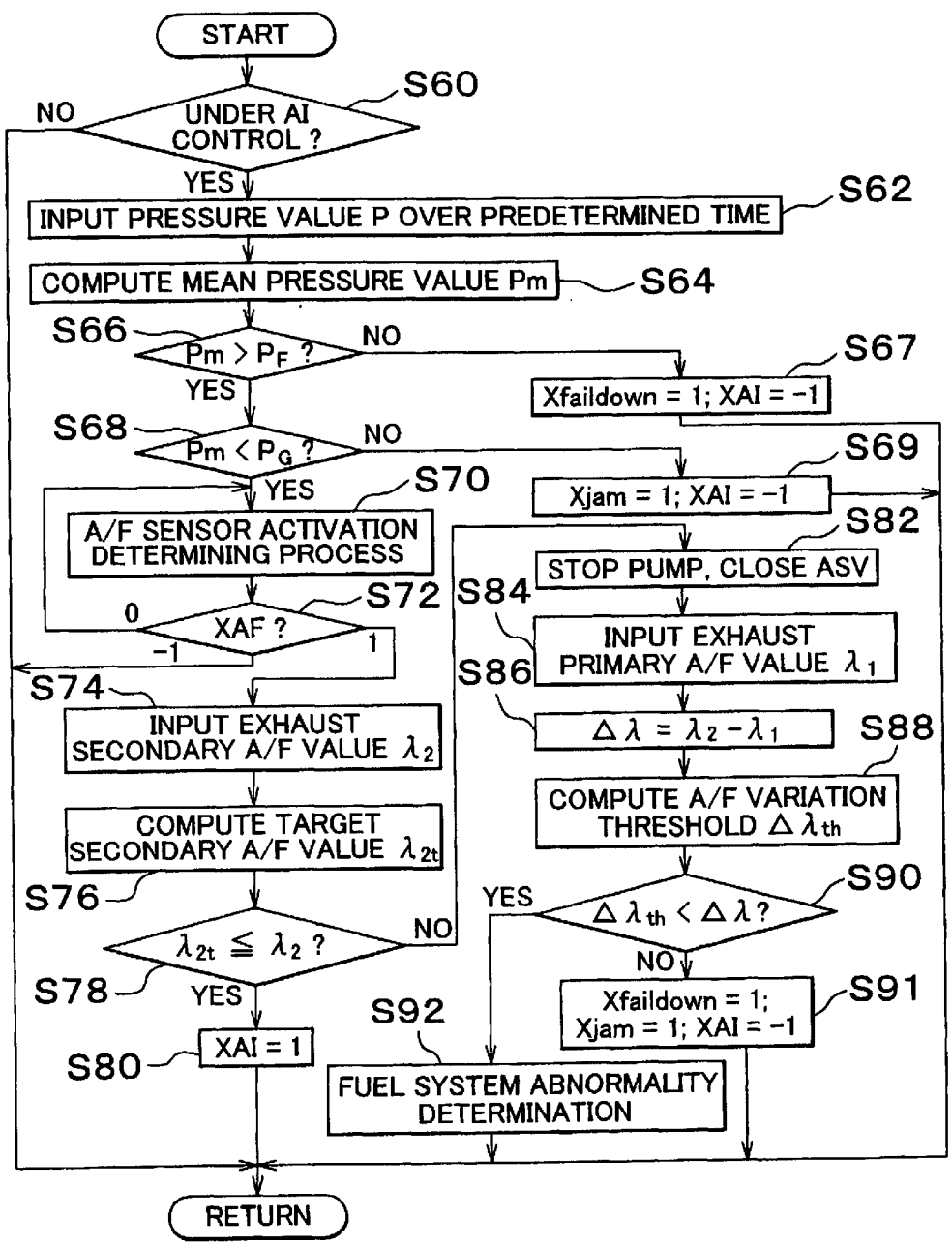
FIG. 16 is a main flowchart illustrating a fourth abnormality detecting routine.

FIG. 16 illustrates a main flow of the abnormality detecting routine. First in step S60, it is checked whether the AI control is being executed. If the AI control is not being executed, the process ends, skipping the processes that follow. Conversely, if the AI control is being executed, the process proceeds to step S62.

Next, fluctuations in the ejection pressure P of the air pump 12 over a predetermined time, that is, values measured by the pressure sensor 15 in reality, are input (step S62), and a mean pressure value Pm is computed (step S64). Subsequently, the mean pressure value Pm is compared with a threshold $P_F$ (step S66). If Pm is not greater than $P_F$, which means insufficient amount of ejection (see FIG. 8), then the process proceeds to step S67. In step S67, the flag Xfaildown for indicating a reduction in the flow through the air pump is set at "1", and the flag XAI indicating a state of the system is set at "−1" indicating a failure state. After that, the process ends.

Conversely, if the mean pressure value Pm is greater than $P_F$, the process proceeds to step S68, in which Pm is compared with a threshold value $P_G$ ($P_F<P_G$) If Pm is not less than $P_G$, it is determined that the air pump 12 is normal but the piping is clogged so that the ejection pressure has increased. Then, the process proceeds to step S69, in which the flag Xjam for indicating pipe clogging is set at "1", and the flag XAI for indicating a state of the system is set at "−1" indicating a failure state. After that, the process ends.

Conversely, if the mean pressure value Pm is less than $P_G$, the process proceeds to step S70, in which an A/F sensor activation determining process is performed. The A/F sensor herein refers to a sensor capable of detecting the air-fuel ratio of exhaust, the excess air ratio, etc., including the $O_2$ sensor 31 shown in FIG. 1.

Figure 17:
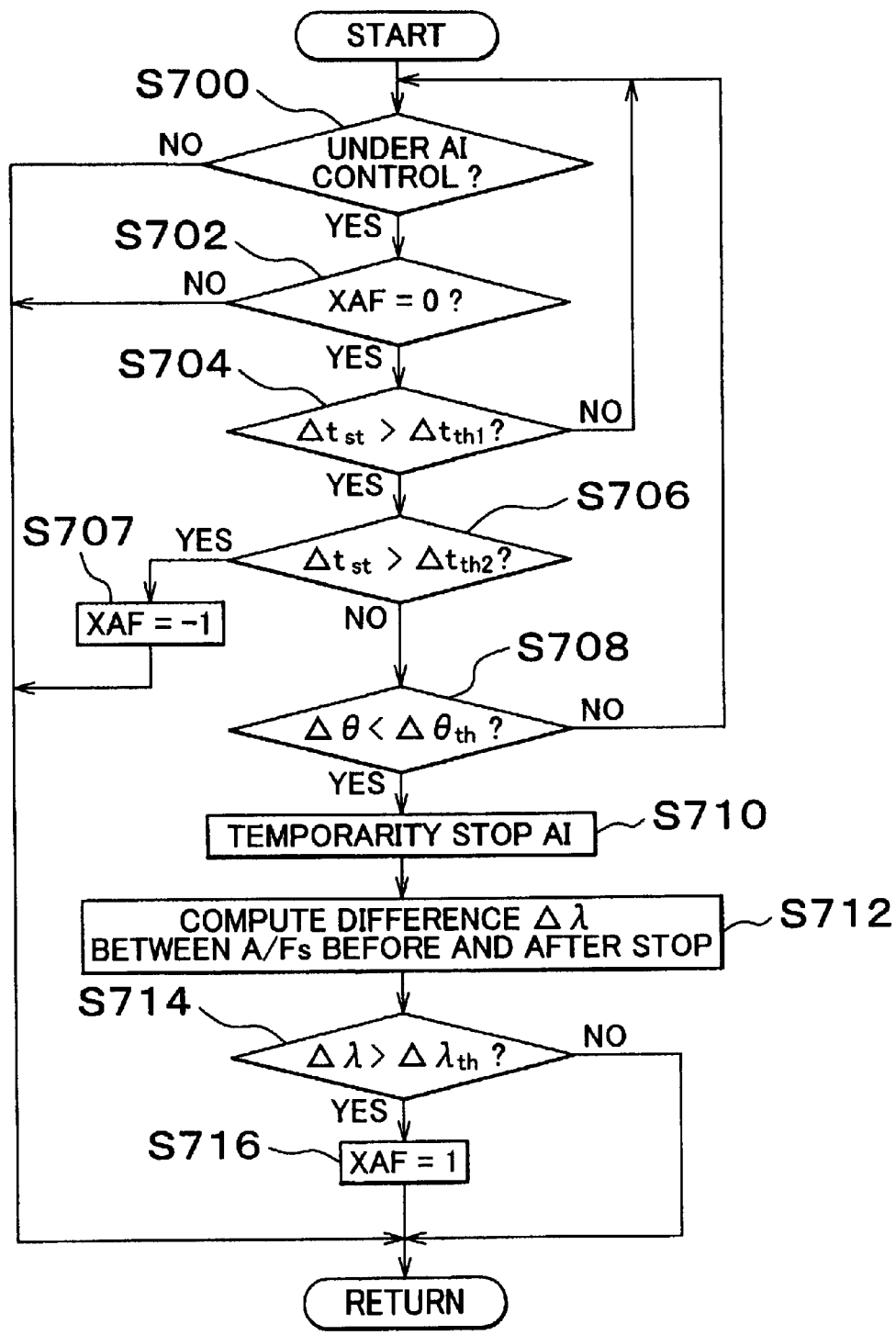
FIG. 17 is a flowchart detailing an A/F sensor activation determining process that is a portion of the process illustrated in FIG. 16.
Figure 18A:
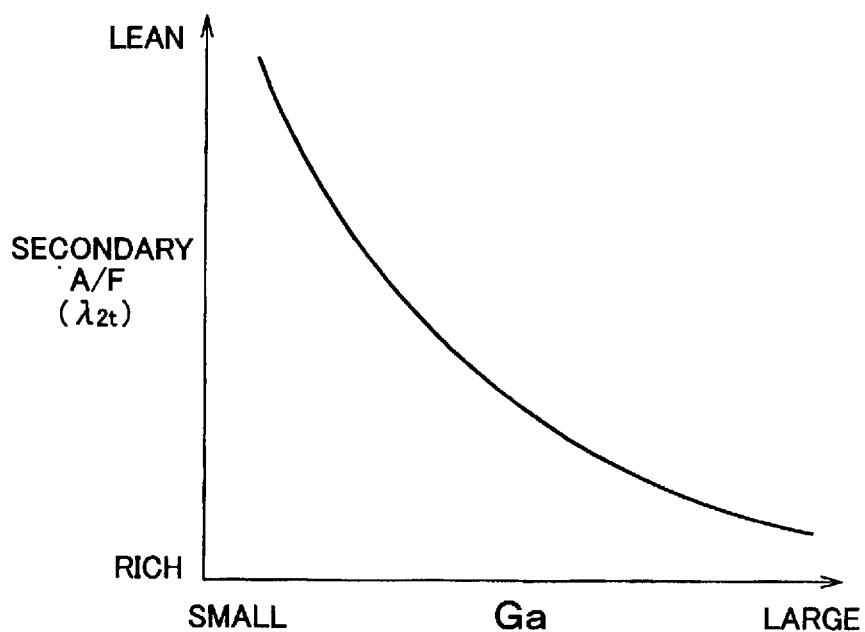
FIGS. 18A and 18B are graphs indicating a relationship between the amount of intake air and the secondary A/F value, and a relationship between the amount of intake air and the A/F variation value, respectively.
Figure 18B:
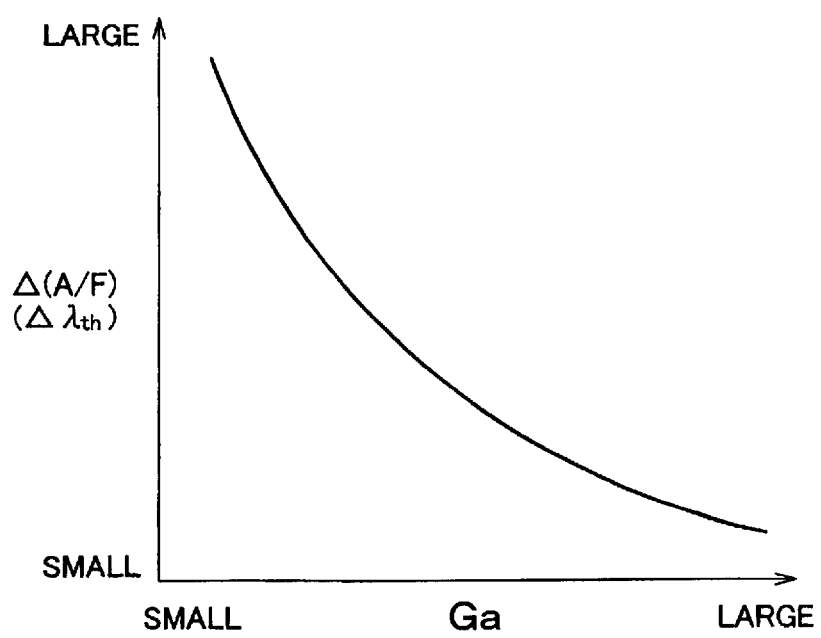

FIG. 17 is a flowchart illustrating the specific processing of the A/F sensor activation determining process. First in step S700, it is checked whether the AI control is being executed. If the control is not being executed, the process immediately goes to the end, without any further step. In step S702 subsequent to the affirmative determination at step S700, the value of the flag XAF for indicating an activation state is checked. The flag XAF assumes a value of "0" if the activation determination has not been completed. The flag assumes "−1" in the case of a sensor abnormality, and assumes "1" in the case of the activation has been completed. If it is determined in step S702 that XAF is other than "0", the process immediately goes to the end, without any further processing step.

In steps S704 and S706, the elapsed time $\Delta t_{st}$ following the startup of the engine is compared with predetermined threshold values $\Delta t_{th1}$, $\Delta t_{th2}$, respectively ($\Delta t_{th1}<\Delta t_{th2}$). If $\Delta t_{st}$ is not greater than $\Delta t_{th1}$, there is a possibility of unstable rotation of the engine 2, and therefore the process proceeds to step S700 so as to repeat the process starting at step S700. If $\Delta t_{st}$ is equal to or greater than $\Delta t_{th2}$, it is indicated that the A/F sensor has not been activated despite elapse of $\Delta t_{th2}$, and therefore it is determined that the A/F sensor is abnormal. Then, the process proceeds to step S707, in which, the flag XAF is set at "−1". After that, the process ends. In the other cases, that is, if the $\Delta t_{st}$ is greater than $\Delta t_{th1}$ but is less than $\Delta t_{th2}$, the process proceeds to step S708, in which a time-dependent change $\Delta\theta$ in the degree of throttle opening is input from the engine ECU 23, and is compared with a threshold value $\Delta\theta th$. If $\Delta\theta$ is not less than $\Delta\theta th$, the engine 2 is in a transitional state, and therefore, the activation determining process described below cannot be precisely performed. Then, the process returns to step S707, so that the process starting at step S700 is repeated.

If it is determined in step S708 that $\Delta\theta$ is less than $\Delta\theta$, the air pump 12 is stopped and the ASV 13 is closed so as to temporarily stop the AI control (step S710). Subsequently, a difference Δλ between the A/F ratios before and after the stopping is computed from values output from the $O_2$ sensor 31 (step S712). Subsequently in step S714, the difference Δλ is compared with a threshold value Δλth. If a significant difference is observed between the A/F ratio during the AI supply and the A/F ratio during the stop, it can be considered that the A/F sensor has activated, and the process proceeds to step S715, in which the flag XAF is set at "1". After that, the process ends. Conversely, if there is no significant A/F ratio difference, it is considered that the A/F sensor has not activated. The flag XAF is not changed, but is left with "0", and the process ends.

After the end of the determining process illustrated in FIG. 17, the process returns to step S72 in FIG. 16, in which the value of the flag XAF is checked. If the value is "0", the process returns to step S70 (preferably, a certain wait time is provided), in order to perform the determination again. If the value of the flag XAF is "−1", it is impossible to perform the following process using the A/F sensor. Therefore, the process immediately ends, without any further processing step. If the value of the flag XAF is "1", the process proceeds to step S74.

In step S74, an exhaust secondary A/F value $\lambda_2$ is read from an output of the $O_2$ sensor 31. Subsequently, a target secondary A/F value $\lambda_{2t}$ is computed from an intake air amount Ga measured by the air flow meter 26 (step S76). The values Ga and $\lambda_{2t}$ have a relationship indicated in FIG. 18A. In step S78, $\lambda_2$ is compared with $\lambda_{2t}$. If $\lambda_2$ is greater than or equal to $\lambda_{2t}$, it is considered that there is sufficient supply of secondary air. Then, the process proceeds to step S80, in which the flag XAF for indicating a state of the system is set at "1" indicating that the system is normal. After that, the process ends.

Conversely, if $\lambda_2$ is less than $\lambda_{2t}$, that means insufficient supply of secondary air. Then, the air pump 12 is stopped and the ASV 13 is closed so as to stop supplying secondary air (step S82). The present output of the $O_2$ sensor 31, that is, the exhaust A/F value $\lambda_1$ at the time of stop of the supply of secondary air (hereinafter, referred to as "primary A/F value") is input (step S84). Subsequently, a difference Δλ between $\lambda_2$ and $\lambda_1$ is determined (step S86), and a target A/F variation Δ(A/F)=Δλth is computed from the amount of intake air Ga measured by the air flow meter 26 (step S88). The values Ga and Δλth have a relationship indicated in FIG. 18B. Subsequently, Δλ is compared with Δλth (step S90). If Δλ is less than or equal to Δλth, it is determined that although the amount of ejection is actually insufficient, the ejection pressure itself has increased due to clogging. Then, the process proceeds to step S91, in which the flags Xjam and Xfaildown are set at "1", and the flag XAF is set at "−1". After that, the process ends.

The above-described process makes it possible to precisely determine a reduction in the amount of flow through the air pump 12 and the clogging of the piping 11.

Next, a fifth abnormality detecting routine will be described with reference to FIGS. 19 and 20. This abnormality detecting routine is performed in the secondary air supply apparatus illustrated in FIG. 1.

Figure 19:
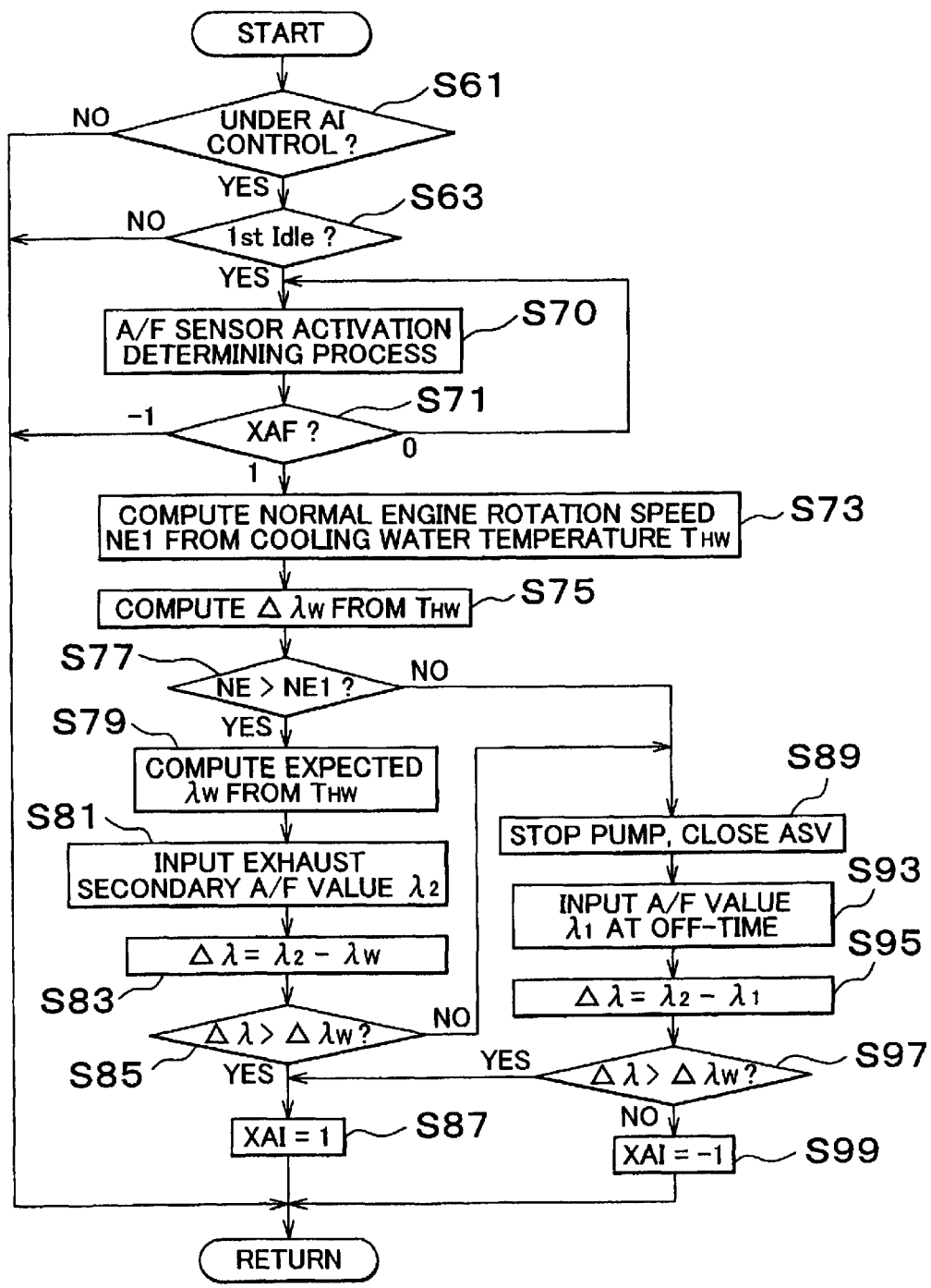
FIG. 19 is a main flowchart illustrating a fifth abnormality detecting routine.

FIG. 19 is a main flowchart of the fifth abnormality detecting routine. First in step S61, it is checked whether the AI control is being executed. If the AI control is not being executed, the process immediately ends without any further processing step. Conversely, if the AI control is being executed, the process proceeds to step S63, in which it is checked whether the engine is in an initial idling state after the startup (first idle state).

If the present engine state is not the first idle, the process immediately ends without any further processing step. Conversely, if the engine state is the first idle, the process proceeds to step S70, in which an A/F sensor activation determining process is performed. The content of the activation determining process is illustrated in FIG. 17. After the activation determining process, the process proceeds to step S71, in which the value of the flag XAF is checked. If the value of the flag is "0", the process returns to step S70 (preferably, a certain wait time is provided), in order to perform the determination again. If the value of the flag is "−1", it is impossible to perform the subsequent process using the A/F sensor. Therefore, the process immediately ends, without any further processing step. If the value of the flag is "1", the process proceeds to step S73.

Figure 20A:
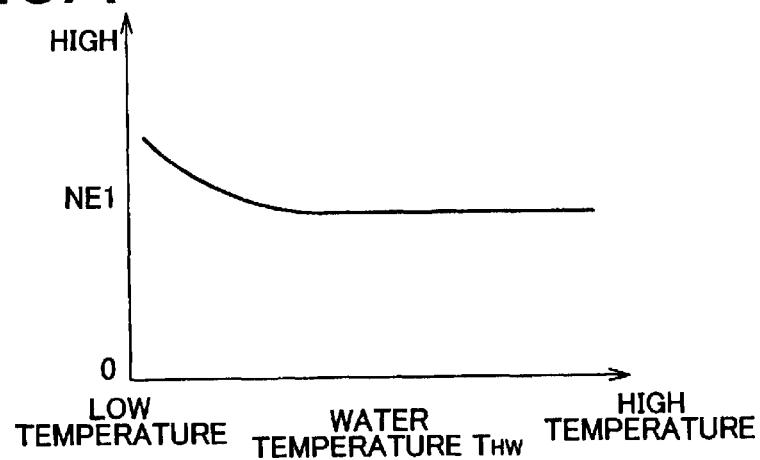
FIGS. 20A, 20B and 20C are graphs indicating relationships of the engine cooling water temperature with the normal engine rotation speed, the expected increased A/F value due to the supply of secondary air, and the expected A/F value without supply of secondary air, respectively.

In step S73, cooling water temperature THW data is received from the engine ECU 23, and a normal engine rotation speed NE1 is computed based on a relationship indicated in FIG. 20A.

Subsequently, Δλw, that is, the A/F value that is expected to increase due the supply of secondary air, is computed from the cooing water temperature THW based on a relationship indicated in FIG. 20C (step S75). Subsequently in step S77, the actual engine rotation speed NE is compared with NE1.

Figure 20B:
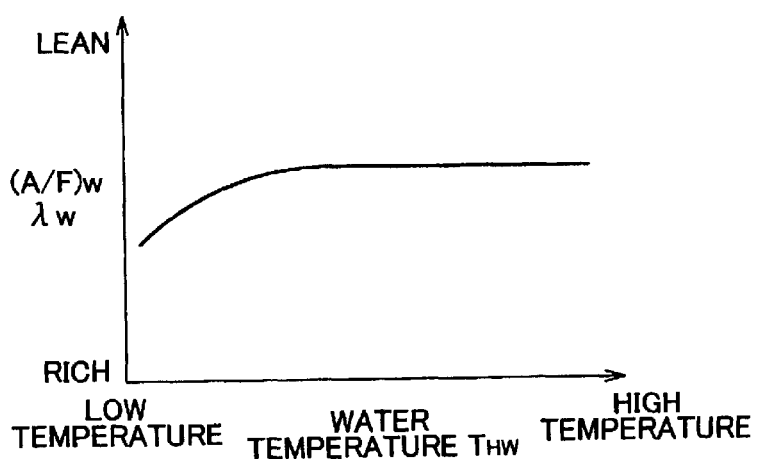
Figure 20C:
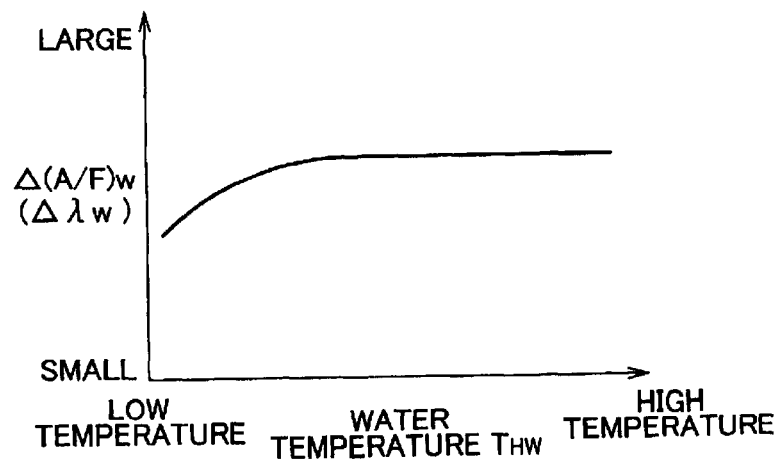

If NE is greater than NE1, the process proceeds to step S79, in which λw, that is, an estimated A/F value for the case of no secondary air supply, is computed from the cooling water temperature THW based on a relationship indicated in FIG. 20B. Subsequently, an exhaust secondary A/F value $\lambda_2$ is read from an output of $O_2$ sensor 31 (step S81), and a difference Δλ between $\lambda_2$ and λw is determined (step S83). Then, Δλ is compared with Δλw (step S85).

If Δλ is greater than Δλw, it is determined that there is sufficient supply of secondary air and therefore the secondary air supply apparatus is normal. Then, the process proceeds to step S87, in which the flag XAF is set at "1". After that, the process ends.

If it is determined in step S77 that NE is less than or equal to NE1, or if it is determined in step S85 that Δλ is less than or equal to Δλw, the process proceeds to step S89, in which the air pump 12 is stopped and the ASV 13 is closed so as to stop supplying secondary air. Subsequently, an exhaust primary A/F value $\lambda_1$ at the time of stop of the supply of secondary air is read from an output of the $O_2$ sensor 31 (step S93), and a difference Δλ between $\lambda_2$ and λw is determined (step S95). Then, Δλ is compared with Δλw (step S97).

If Δλ is greater than Δλw, it is determined that there is sufficient supply of secondary air and therefore the secondary air supply apparatus is normal. Then, the process proceeds to step S87, in which the flag XAF is set at "1". After that, the process ends.

If Δλ is less than Δλw, it is determined that the supply of secondary air is not sufficient and therefore the secondary air supply apparatus is abnormal. Then, the process proceeds to step S99, in which the flag XAF is set at "−1". After that, the process ends.

In this abnormality detecting routine, if the normal state is determined using an expected AF value, that is, if the engine is in a good combustion state immediately following the startup, the determining process based on the forcible turning off of the secondary air supply apparatus is not performed. Therefore, emission degradation can be prevented or reduced. Thus, this abnormality detecting routine is preferable.

The invention is not limited to application of the above-described abnormality detecting routines, but includes all the combinations thereof, and modifications, changes and improvements of the routine with a basic common idea.

Thus, according to the foregoing embodiments of the invention, it is possible to precisely determine whether there is an abnormality, malfunction or other defective conditions in various component elements of the secondary air supply apparatus, that is, an air pump, an open-close valve, a check valve, a piping, etc., and, and the content of the abnormality and the like. Furthermore, depending on the defective condition or the like, it is possible to perform determination at an early stage before or during the secondary air supply control.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A secondary air supply apparatus, comprising:
   a secondary air supply passage for supplying a secondary air to an upstream side of an emission control device in an exhaust system of an internal combustion engine;
   an opening-closing device that opens and closes the secondary air supply passage;
   a pressure sensor disposed in the secondary air supply passage; and
   an abnormality detecting portion that detects an abnormality of a component element based on a mean value of a pressure detected by the pressure sensor, and a pressure variation value.

2. A method for detecting an abnormality of a secondary air supply apparatus for supplying a secondary air to an upstream side of an emission control device in an exhaust system of an internal combustion engine, the method comprising:
   detecting a mean value of a pressure in the secondary air supply passage;
   calculating a variation value of the pressure value; and
   detecting an abnormality of a component element based on the mean pressure value and the pressure variation value.

3. The secondary air supply apparatus according to claim 1, wherein the abnormality detecting portion detects a failure mode of the component element from a combination of a pressure behavior pattern occurring at a time of a secondary air supply control and a pressure behavior pattern occurring at a time of a secondary air supply stop control.

4. The secondary air supply apparatus according to claim 3, wherein an air pump is disposed upstream of the opening-closing device, and the pressure sensor is disposed at an intermediate position between the air pump and the opening-closing device.

5. The secondary air supply apparatus according to claim 4, wherein the pressure sensor is an absolute pressure sensor, and the abnormality detecting portion stores, as an atmospheric pressure, a detection value detected by the pressure sensor immediately before a startup of the engine.

6. The secondary air supply apparatus according to claim 4, wherein the abnormality detecting portion further has a function of monitoring an amount of flow through the air pump from an output value from the pressure sensor.

7. The secondary air supply apparatus according to claim 4, wherein the abnormality detecting portion detects clogging of the secondary air supply passage by detecting an ejection pressure of the air pump while driving the air pump at a time of an opening control of the opening-closing device and at a time of a closing control of the opening-closing device.

8. The secondary air supply apparatus according to claim 1, further comprising an air-fuel ratio sensor disposed in the exhaust system, wherein an output of the air-fuel ratio sensor is input to the abnormality detecting portion.

9. The secondary air supply apparatus according to claim 8, wherein the abnormality detecting portion performs an abnormality determination based on a difference between an actual air-fuel ratio and a target air-fuel ratio in accordance with an amount of intake air.

10. The secondary air supply apparatus according to claim 8, wherein the abnormality detecting portion performs an abnormality determination based on a difference between an actual air-fuel ratio and an expected air-fuel ratio in accordance with an engine cooling water temperature.

11. The secondary air supply apparatus according to claim 8, wherein the abnormality detecting portion performs an abnormality determination based on a difference between an air-fuel ratio at a time of a secondary air supply control and an air-fuel ratio at a time of a stop control.

12. The secondary air supply apparatus according to claim 8, wherein the abnormality detecting portion determines whether the air-fuel ratio sensor has activated, by forcibly temporarily turning off the secondary air supply control.

13. The secondary air supply apparatus according to claim 1, wherein the pressure sensor is disposed between the opening-closing device and a check valve.

14. The secondary air supply apparatus to claim 13, wherein the abnormality detecting portion detects an abnormality of the check valve based on the pressure variation value and the pressure value detected by the pressure sensor while the opening-closing device is in a closure control state.

15. The method according to claim 2, further comprising:
   detecting a failure mode of the component element from a combination of a pressure behavior pattern occurring at a time of a secondary air supply control and a pressure behavior pattern occurring at a time of a secondary air supply stop control.

16. The method according to claim 2, further comprises a step of performing an abnormality determination based on a difference between an actual air-fuel ratio of exhaust gas and an expected air-fuel ratio of exhaust gas in accordance with an engine cooling water temperature.

17. The method according to claim 2, further comprises a step of performing an abnormality determination based on a difference between an air-fuel ratio of exhaust gas at a time of a secondary air supply control and an air-fuel ratio of exhaust gas at a time of a stop control.

18. The method according to claim 2, wherein the secondary air supply apparatus further comprises an air-fuel ratio sensor disposed in the exhaust system,
   the method further comprises a step of determining whether the air-fuel ratio sensor has activated, by forcibly temporarily turning off the secondary air supply control.

19. A method for detecting an abnormality of a secondary air supply apparatus that includes a secondary air supply passage for supplying a secondary air to an upstream side of an emission control device in an exhaust system of an internal combustion engine, an opening-closing device that opens and closes the secondary air supply passage, a pressure sensor disposed in the secondary air supply passage, the method comprising:

detecting a mean value of a pressure in the secondary air supply passage;

calculating a variation value of the pressure value;

detecting an abnormality of a component element based on the mean pressure value and the pressure variation value.

20. The method according to claim 2, wherein the pressure sensor is disposed between the opening-closing device and a check valve, the method includes a step of detecting an abnormality of the check valve based on the pressure variation value and the pressure value detected by the pressure sensor while the opening-closing device is in a closure control state.

21. The method according to claim 2, further comprises a step of performing an abnormality determination based on a difference between an actual air-fuel ratio of exhaust gas and a target air-fuel ratio of exhaust gas in accordance with an amount of intake air.

22. The method according to claim 15, wherein an air pump is disposed upstream of the opening-closing device, and the pressure sensor is disposed at an intermediate position between the air pump and the opening-closing device, the method includes a step of monitoring an amount of flow through the air pump from an output value from the pressure sensor.

23. The method according to claim 15, wherein an air pump is disposed upstream of the opening-closing device, and the pressure sensor is disposed at an intermediate position between the air pump and the opening-closing device, the method further comprises a step of detecting clogging of the secondary air supply passage by detecting an ejection pressure of the air pump while driving the air pump at a time of an opening control of the opening-closing device and at a time of a closing control of the opening-closing device.

24. The secondary air supply apparatus according to claim 1, further comprising a check valve disposed downstream of the opening-closing device.

25. The method according to claim 24, further comprising a check valve disposed downstream of the opening-closing device.

* * * * *